US009046343B2

(12) United States Patent
Clark

(10) Patent No.: US 9,046,343 B2
(45) Date of Patent: Jun. 2, 2015

(54) SYSTEMS AND METHODS FOR WELL POSITIONING USING PHASE RELATIONS BETWEEN TRANSVERSE MAGNETIC FIELD COMPONENTS OF A TRANSVERSE ROTATING MAGNETIC SOURCE

(75) Inventor: Brian Clark, Sugar Land, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 900 days.

(21) Appl. No.: 13/128,432

(22) PCT Filed: May 13, 2009

(86) PCT No.: PCT/US2009/043707
§ 371 (c)(1),
(2), (4) Date: Jul. 26, 2011

(87) PCT Pub. No.: WO2010/065161
PCT Pub. Date: Jun. 10, 2010

(65) Prior Publication Data
US 2011/0278067 A1 Nov. 17, 2011

Related U.S. Application Data

(60) Provisional application No. 61/119,073, filed on Dec. 2, 2008.

(51) Int. Cl.
E21B 47/092 (2012.01)
G01B 7/30 (2006.01)
E21B 43/30 (2006.01)
E21B 47/022 (2012.01)
G01B 7/00 (2006.01)
G01C 17/28 (2006.01)

(52) U.S. Cl.
CPC .............. $G01B$ $7/30$ (2013.01); $E21B$ $43/305$ (2013.01); $E21B$ $47/02216$ (2013.01); $G01B$ $7/003$ (2013.01); $G01C$ $17/28$ (2013.01)

(58) Field of Classification Search
CPC ...................................................... E21B 47/092
USPC ......... 175/45, 61, 73, 40, 24; 166/254.1, 66.5, 166/65.1, 255.1, 250.01; 702/6, 9, 151
See application file for complete search history.

(56) References Cited

U.S. PATENT DOCUMENTS 4,682,421 A * 7/1987 van Dongen et al. ............ 33/302
4,700,142 A * 10/1987 Kuckes ....................... 340/853.5

(Continued)

OTHER PUBLICATIONS

Nekut, A. G. et al, "Rotating Magnet Ranging—a new drilling guidance technology", presented at the 8th One Day Conference on Horizontal Well Technology, Canadian Section SPE, Nov. 7, 2001, pp. 1-8.

Primary Examiner — David Bagnell
Assistant Examiner — Ronald Runyan
(74) Attorney, Agent, or Firm — Kimberly Ballew

(57) ABSTRACT

Systems and methods for well-drilling operations involving magnetic ranging with a rotating magnetic source are provided. In one embodiment, a system for determining a relative location of a magnetic source includes a three-axis magnetometer and data processing circuitry. The three-axis magnetometer may measure a time-dependent magnetic field caused by a magnetic source rotating about an axis, which may include two transverse components transverse to the axis and the data processing circuitry may determine a transverse angle of rotation of the measurements such that one of the two transverse components is $\pm\pi/2$ radians out-of-phase with the other when the measurements are transformed by the transverse angle of rotation. The data processing circuitry may determine a spatial relationship between the magnetic source and the three-axis magnetometer based at least in part on the transverse angle of rotation.

16 Claims, 16 Drawing Sheets

(56) References Cited

U.S. PATENT DOCUMENTS

| | | |
|---|---|---|
| 5,589,775 A | 12/1996 | Kuckes |
| 6,586,937 B2 | 7/2003 | Goodman |
| 6,736,222 B2 | 5/2004 | Kuckes et al. |
| 6,842,699 B2 | 1/2005 | Estes |
| 2011/0282583 A1 | 11/2011 | Clark |

* cited by examiner

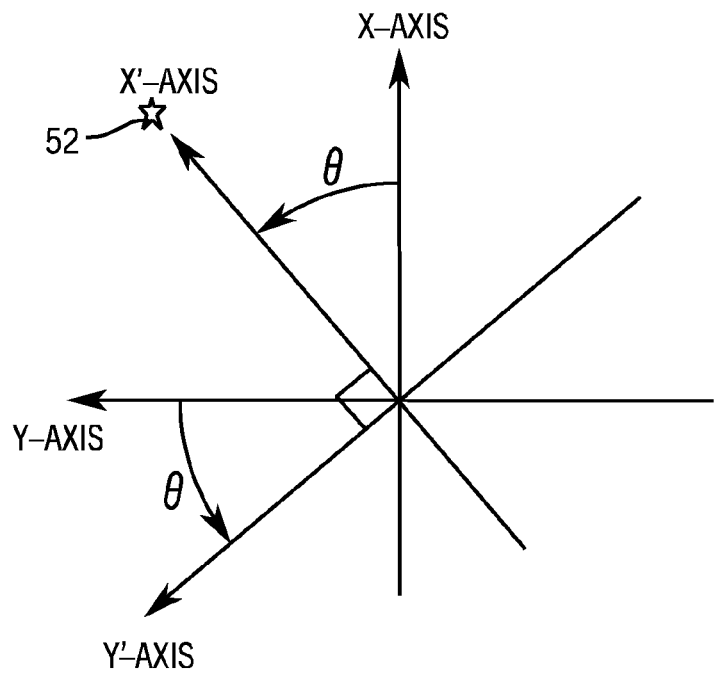

| MEASURE THE MAGNETIC FIELD COMPONENTS OF THE ROTATING MAGNETIC DIPOLE OVER TIME IN THE ( X, Y, Z ) COORDINATE SYSTEM | ─56 |

| DETERMINE AN ANGLE $\theta$ TO ROTATE FROM THE ( X, Y, Z ) COORDINATE SYSTEM INTO THE ( X', Y', Z' ) COORDINATE SYSTEM SUCH THAT THE MAGNETIC FIELD COMPONENT IN THE X'-DIRECTION IS $\pi/2$ OUT-OF-PHASE WITH THE MAGNETIC FIELD COMPONENT IN THE Y-DIRECTION | ─58 |

| SOLVE EQUATIONS (5A) TO (5D) TO DETERMINE THE COORDINATES OF THE OBSERVATION POINT WITH RESPECT TO THE MAGNETIC DIPOLE | ─60 |

FIG. 10

SYSTEMS AND METHODS FOR WELL
POSITIONING USING PHASE RELATIONS
BETWEEN TRANSVERSE MAGNETIC FIELD
COMPONENTS OF A TRANSVERSE
ROTATING MAGNETIC SOURCE

BACKGROUND OF THE INVENTION

The present disclosure relates generally to well drilling operations and, more particularly, to well drilling operations involving magnetic ranging using a rotating magnetic source.

To access certain hydrocarbons in the earth, two or more wells or boreholes may be drilled with a certain spatial relationship with respect to one another; specifically, one borehole may be drilled such that it has a specific location relative to a previously drilled borehole. For example, heavy oil may be too viscous in its natural state to be produced from a conventional well, and, thus, an arrangement of cooperative wells and well features may be utilized to produce such oil. Indeed, to produce heavy oil, a variety of techniques may be employed, including, for example, Steam Assisted Gravity Drainage (SAGD), Cross Well Steam Assisted Gravity Drainage (X-SAGD), or Toe to Heel Air Injection (THAI). All such techniques may benefit by determining a borehole assembly (BHA) location relative to an existing well.

SAGD may generally involve two parallel wells separated by an approximately constant vertical separation distance (e.g., 4 to 6 m) and an approximately constant transverse horizontal separation distance (e.g., within 1 m) over a horizontal distance of roughly 500 m to 1500 m. The upper well in a SAGD well pair may be known as an "injector well." The injector well may inject superheated steam into a heavy oil zone formation, creating a steam chamber to heat the heavy oil contained therewithin. The lower well in a SAGD well pair may be known as a "producer well." When the heated heavy oil becomes less viscous, gravity may pull the oil into the producer well below, from which the oil may be extracted.

Conventional measurement while drilling (MWD) survey data may not provide sufficient accuracy to maintain a consistent separation distance between the injector well and the producer well. Indeed, the direction of a horizontal well may be measured and controlled to approximately +/−3°, and the inclination may be measured and controlled to approximately +/−1°, using conventional MWD sensors and good directional steering practices. However, such relatively small angles may produce large errors in the position of a long horizontal well. For example, a horizontal well with a 1000 meter length having a 3° drift may have a 52 meter lateral error at the toe of the well. If the same horizontal well has a 1° drift in inclination, the well may also have a 17 meter vertical error.

To drill one well, such as an injector well, with a certain spatial relationship with respect to an existing well, such as a producer well, conventional magnetic ranging techniques may be employed. However, determining a position of a BHA in the injector well relative to a magnetometer in the producer well may involve many time-consuming measurements using conventional magnetic ranging. For example, measurements may be taken at several distinct locations within one or the other well, and the magnetometer may be moved forward or backward a specified distance before taking each measurement. Additionally, such conventional techniques may necessitate that the two wells be essentially parallel, and may not provide a relative location until the BHA has drilled a distance at least equal to the inter-well separation distance.

SUMMARY

Certain aspects commensurate in scope with the originally claimed embodiments are set forth below. It should be understood that these aspects are presented merely to provide the reader with a brief summary of certain forms the disclosed embodiments might take and that these aspects are not intended to limit the scope of the invention. Indeed, the invention may encompass a variety of aspects that may not be set forth below.

The present disclosure relates to systems and methods for drilling a well involving magnetic ranging using a rotating magnetic source. In one embodiment, a system for determining a relative location of a magnetic dipole includes a three-axis magnetometer and data processing circuitry. The three-axis magnetometer may measure a time-dependent magnetic field caused by a magnetic source rotating about an axis, which may include two transverse components transverse to the axis and the data processing circuitry may determine a transverse angle of rotation of the measurements such that one of the two transverse components is $+\pi/2$ radians out-of-phase with the other when the measurements are transformed by the transverse angle of rotation. The data processing circuitry may determine a spatial relationship between the magnetic source and the three-axis magnetometer based at least in part on the transverse angle of rotation.

BRIEF DESCRIPTION OF THE DRAWINGS

Advantages of the invention may become apparent upon reading the following detailed description and upon reference to the drawings in which:

FIG. 9 is a schematic illustrating geometry associated with a rotated frame of reference for magnetic field measurements taken from an observation point, in accordance with an embodiment;

FIG. 10 is a flowchart describing a method of determining a relative location between a rotating magnetic dipole and a magnetometer, in accordance with an embodiment;

DETAILED DESCRIPTION OF SPECIFIC EMBODIMENTS

One or more specific embodiments of the present invention are described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Additionally, as used herein, the terms "up" and "down," "upper" and "lower," and other like terms indicating relative positions to a given point or element are utilized to more clearly describe some elements of the embodiments of the invention. Commonly, these terms relate to a reference point at the surface from which drilling operations are initiated as being the top point and the total depth of the well being the lowest point, whether or not the drilled well continues in a true downward direction.

Figure 1:
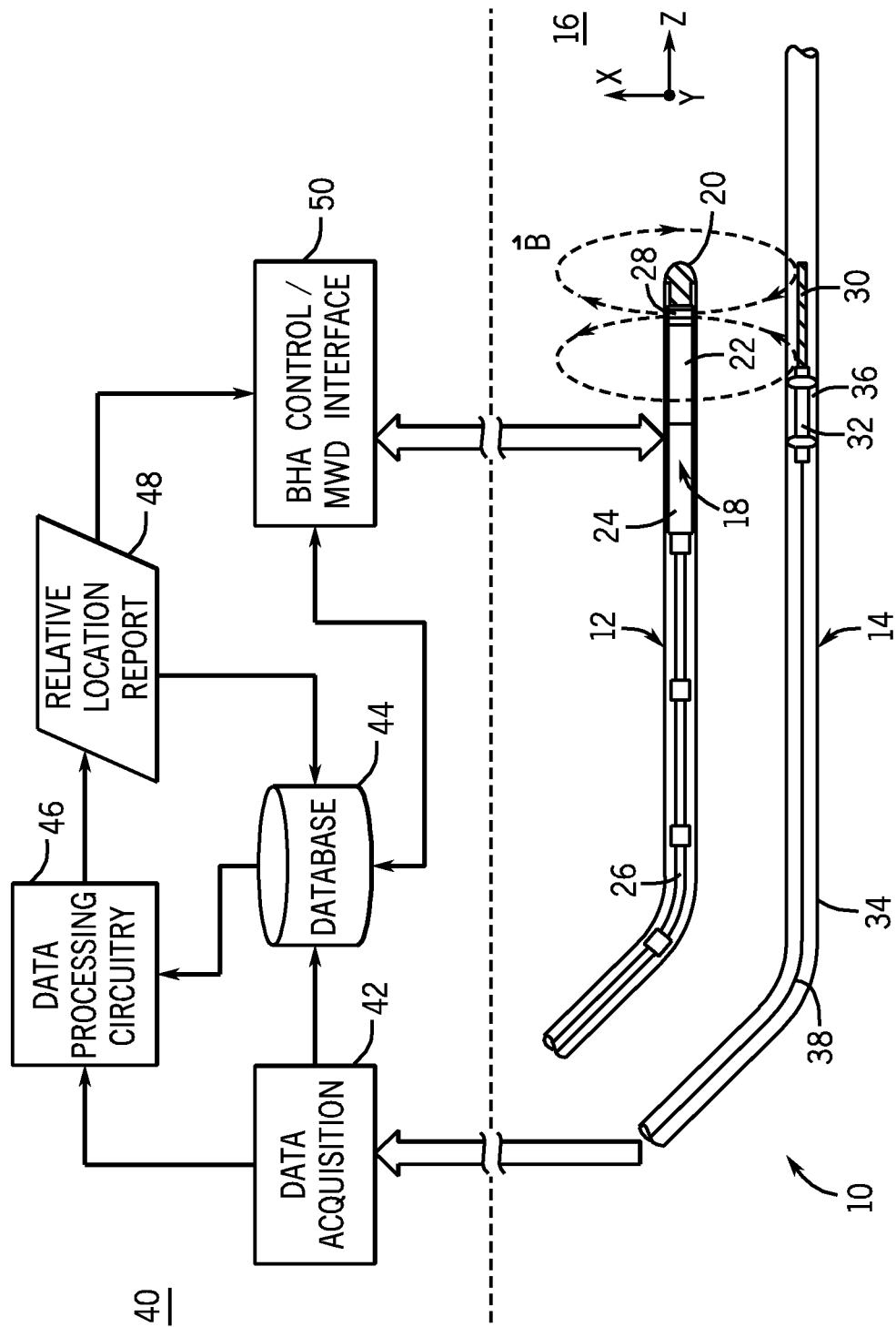
FIG. 1 is a schematic of a well-drilling operation involving magnetic ranging in accordance with an embodiment.

FIG. 1 illustrates a well drilling system 10 for drilling a new well such that the new well has a particular spatial relationship with a prior-drilled well. Particularly, FIG. 1 presents an example involving parallel Steam Assisted Gravity Drainage (SAGD) wells; however, the well drilling system 10 may be used to drill any new well such that the new well has a particular spatial relationship with respect to an existing, prior-drilled well. As illustrated in FIG. 1, a SAGD well pair may be formed when an injector well 12 is drilled approximately constant vertical separation distance (e.g., 4 to 6 m) and an approximately constant transverse horizontal separation distance (e.g., within 1 m) over a horizontal distance of roughly 500 m to 1500 m above a prior-drilled drilled producer well 14 in a heavy oil zone formation 16. However, the well drilling operation 10 and the techniques disclosed herein may be employed to drill a new well having any desired spatial relationship to any existing well. For example, the well drilling operation 10 and the techniques disclosed herein may be employed to drill Cross Well Steam Assisted Gravity Drainage (X-SAGD) wells, Toe to Heel Air Injection (THAI) wells, and/or to avoid collisions with existing wells while drilling in a field having existing wells.

To drill the injector well 12, a borehole assembly (BHA) 18 may include, among other things, a drill bit 20, a steerable system 22 to set the direction of the drill bit 20, and/or one or more measurement while drilling (MWD) or logging while drilling (LWD) tools 24. Drill pipe 26 may provide drilling mud and/or communication to the BHA 18 from the surface. The steerable system 22 may be a rotary steerable system, such as PowerDrive, which may receive downlinked commands and drill ahead in a specified trajectory of direction and inclination. Alternatively, the steerable system 22 may be a mud motor with a bent sub; however, such an arrangement may be less efficient, as it may rely on manual orientations of the bent sub by a driller at the surface to control the direction and inclination of the drill bit 20.

The BHA 18 may further include a magnetic dipole 28 coupled such that the north-south axis of the magnetic dipole 28 is essentially perpendicular to the axis of the BHA 18. As the BHA 18 rotates, the magnetic dipole 28 may rotate accordingly, which may produce a time-dependent magnetic field, illustrated in FIG. 1 as a magnetic field $\vec{B}$. The magnetic dipole 28 may produce the time-dependent magnetic field $\vec{B}$ using a permanent magnet or one or more solenoids. If the magnetic dipole 28 is formed by one or more solenoids, the electric currents driving the solenoids may be direct current (DC), and the BHA 18 may rotate to produce the time-dependent magnetic field $\vec{B}$. Alternatively, the currents driving the solenoids may be alternating current (AC), and the BHA 18 may remain still to produce the time-dependent magnetic field $\vec{B}$. The direction and inclination of the first well may be known, as determined using inclinometer and/or data from the MWD tool 24. Because the north-south axis of the magnetic dipole 28 is essentially perpendicular to the axis of the BHA 18, a coordinate system (x,y,z) may be centered on the magnetic dipole 28, where the z-axis is aligned with the borehole axis, the x-axis points upwards, and the y-axis is horizontal.

A three-axis magnetometer 30 capable of measuring low-frequency AC magnetic fields may be deployed to measure the magnetic field $\vec{B}$ on a wireline tractor 32 inside the producer well 14, which may or may not be cased with magnetic or non-magnetic casing 34. The tractor 32 may also carry a three-axis inclinometer 36, which may enable determination of the gravity tool face (i.e., up, or the high side of the hole). The tractor 32 may move the magnetometer 30 along inside the producer well 14. However, rather than move the magnetometer 30 to take measurements at multiple points along the length of the producer well 14, the tractor 32 may move the magnetometer 30 only occasionally. For reasons discussed below, measurements of the magnetic field $\vec{B}$ over time, observed from a single location in the producer well 14, may provide sufficient information to determine a relative location between the magnetometer 30 in the producer well 14 and the magnetic dipole 28 in the BHA 18. As such, the three-axis magnetometer 30 may take readings of the magnetic field $\vec{B}$ over a predetermined time (e.g., approximately 1-2 seconds or one or more periods of rotation of the magnetic dipole 28), from which the relative location may be determined in accordance with techniques disclosed herein. The BHA 18 may typically rotate at approximately 60 to 180 RPM, while the rate of penetration through the formation 16 may be significantly slower, at approximately 50 to 200 feet per hour. As such, obtaining measurements of the magnetic field $\vec{B}$ from a single configuration may substantially increase the efficiency of magnetic ranging.

Measurements of the magnetic field $\vec{B}$ may be transmitted from the magnetometer 30 over a cable 38 to the surface 40 for processing. As such, the measurements may be received by data acquisition circuitry 42. The data acquisition circuitry 42 may represent a stand-alone, special-purpose data acquisition module associated with the magnetometer 30, or may represent an input device for a general processor-based system that may be employed for processing the measurements in accordance with the present techniques. A database 44 and data processing circuitry 46 may also represent components of a general processor-based system. Such a processor-based system may be a general-purpose computer, such as a personal computer, configured to run a variety of software, including software implementing all or part of the present technique. Alternatively, the processor-based system may include, among other things, a mainframe computer, a distributed computing system, or an application-specific computer or workstation configured to implement all or part of the present technique based on specialized software and/or hardware provided as part of the system. Further, the processor-based system may include either a single processor or a plurality of processors to facilitate implementation of the presently disclosed functionality.

In general, the processor-based system that may encompass all or part of the data acquisition circuitry 42, database 44, and/or data processing circuitry 46 may include a microcontroller or microprocessor, such as a central processing unit (CPU), which may execute various routines and processing functions. For example, the microprocessor may execute various operating system instructions as well as software routines configured to effect certain processes and stored in or provided by a manufacture including a computer readable-medium, such as a memory device (e.g., a random access memory (RAM) of a personal computer) or one or more mass storage devices (e.g., an internal or external hard drive, a solid-state storage device, CD-ROM, DVD, or other storage device). In addition, the microprocessor may process data provided as inputs for various routines or software programs, such as data provided as part of the present techniques in computer-based implementations.

Such data associated with the present techniques may be stored in, or provided by, the memory or mass storage device of the processor-based system that may encompass all or part of the data acquisition circuitry 42, database 44, and/or data processing circuitry 46. Alternatively, such data may be provided to the microprocessor of the processor-based system via one or more input devices. In one embodiment, the data acquisition circuitry 42 may represent one such input device; however, the input devices may also include manual input devices, such as a keyboard, a mouse, or the like. In addition, the input devices may include a network device, such as a wired or wireless Ethernet card, a wireless network adapter, or any of various ports or devices configured to facilitate communication with other devices via any suitable communications network, such as a local area network or the Internet. Through such a network device, the processor-based system may exchange data and communicate with other networked electronic systems, whether proximate to or remote from the system. The network may include various components that facilitate communication, including switches, routers, servers or other computers, network adapters, communications cables, and so forth.

Processing in accordance with techniques of the present disclosure may begin when the measurements of the magnetic field $\vec{B}$, obtained by the magnetometer 30, are received at the surface 40 by the data acquisition circuitry 42. As noted above, the magnetometer 30 may obtain three-axis measurements of the magnetic field $\vec{B}$; though the three axes of the magnetometer 30 may not generally be aligned with the (x,y,z) coordinate system of the magnetic dipole 28, the data acquisition circuitry 42 or the data processing circuitry 46 may rotate the three-axis magnetometer 30 readings into the (x,y,z) coordinate system using known survey information for the two wells and a reading from the inclinometer 36. Henceforth, the three magnetic field components may be understood to have been transformed into the (x,y,z) coordinate system associated with the BHA 18 of the injector well 12.

After receiving the measurements of the magnetic field $\vec{B}$, the data acquisition circuitry 42 may store the measurements in the database 44 or transmit the measurements to the data processing circuitry 46. In accordance with one or more stored routines, the data processing circuitry 46 may employ the measurements of the magnetic field $\vec{B}$, in conjunction with MWD and/or LWD survey data, to ascertain the relative location of the magnetometer 30 to the rotating magnetic dipole 28 in the BHA 18. The data processing circuitry 46 may thereafter output a relative location report 48, which may be stored in the database 44 or transmitted to a BHA control/MWD interface 50. The relative location report 48 may indicate the location of the magnetometer 30 relative to the magnetic dipole 28 of the BHA 18 in the (x,y,z) coordinate system. Additionally or alternatively, the relative location report 48 may be provided to an operator via one or more output devices, such as an electronic display and/or a printer.

The BHA control/MWD interface 50 may communicate with the BHA 18 using E-Pulse-based electric pulse telemetry, mud pulse telemetry, or any other telemetry system communication downlink. Through the communication downlink, the BHA control/MWD interface 50 may control the BHA 18, as well as receive data obtained by the MWD and/or LWD tool 24; such received data may be stored in the database 44 for use by the data processing circuitry 46. In the presently illustrated embodiment, the BHA control/MWD interface 50 may automatically steer the drill bit 20 based on the relative location report 48. Additionally or alternatively, an operator in control of the BHA control/MWD interface 50 may steer the drill bit 20 based on the printed or electronically displayed relative location report 48.

Figure 2:
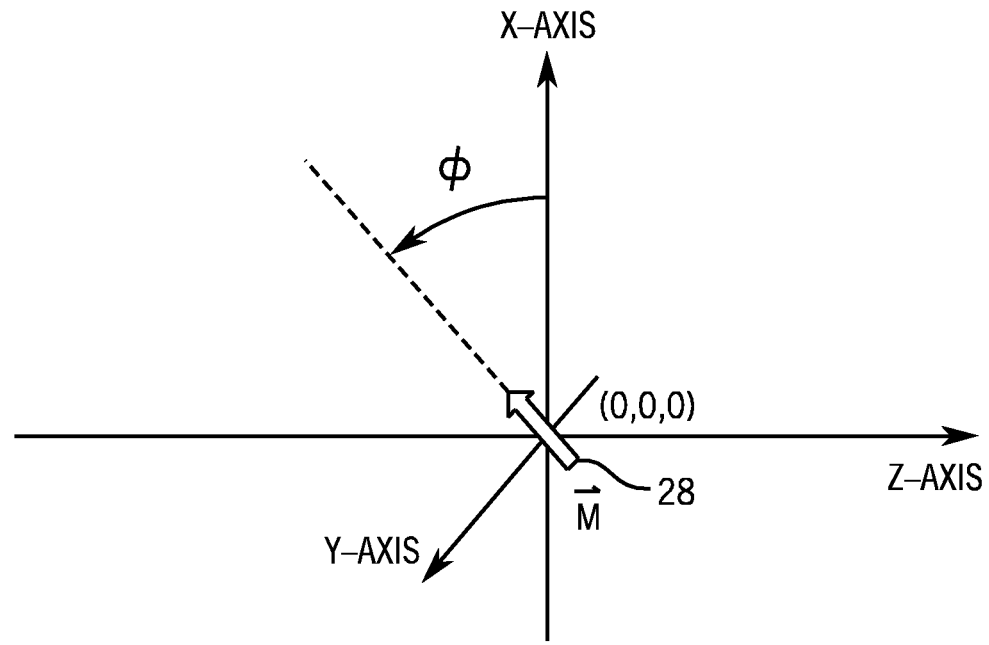
FIG. 2 is a schematic illustrating geometry associated with a rotating magnetic dipole in accordance with an embodiment.
Figure 3:
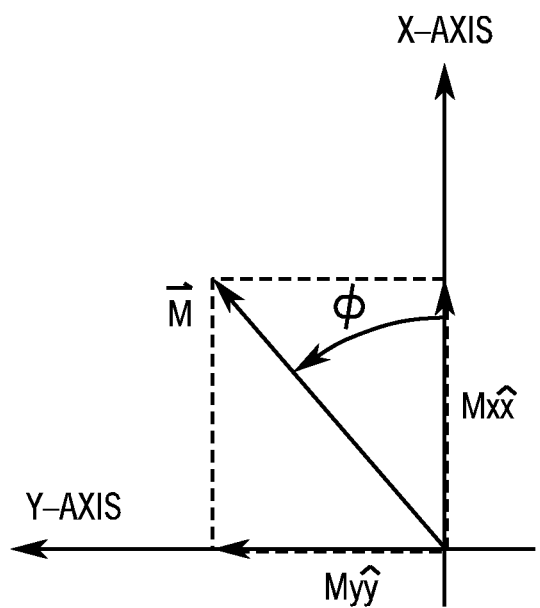
FIG. 3 is a schematic further illustrating the geometry described by FIG. 2.
Figure 4:
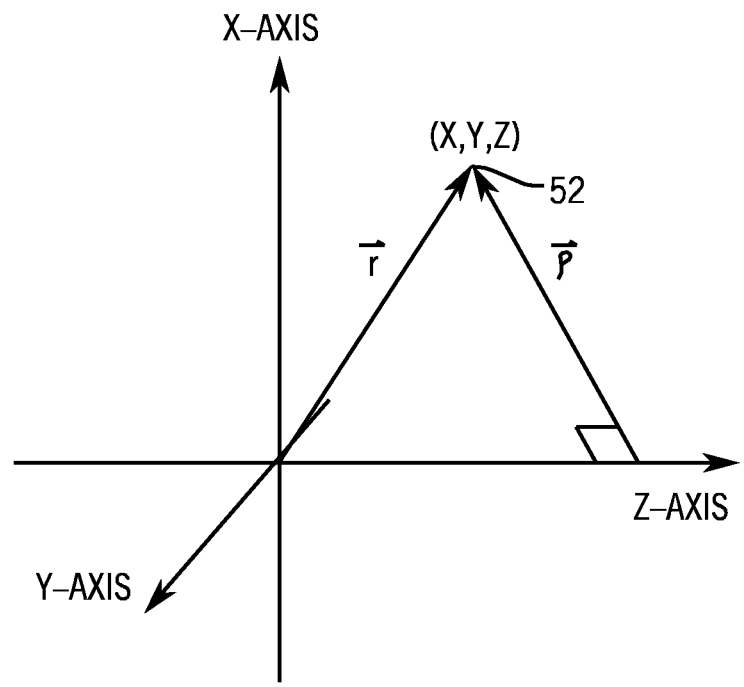
FIG. 4 is a schematic illustrating a spatial relationship between two vectors to an observation point in accordance with an embodiment.
Figure 5:
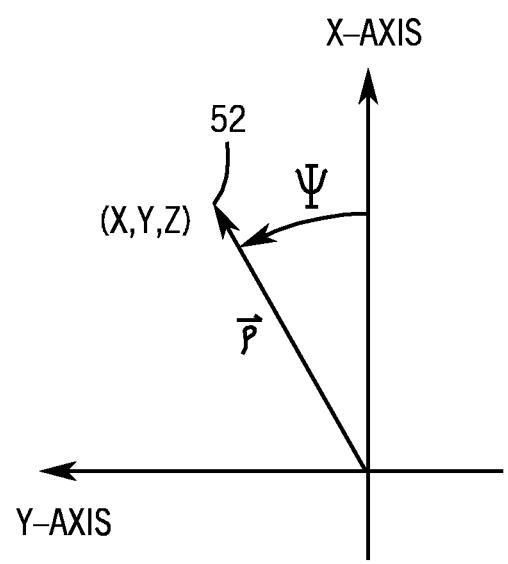
FIG. 5 is a schematic illustrating geometry associated with a transverse vector to the observation point of FIG. 4.

FIGS. 2-7 generally illustrate the geometrical and magnetic relationships between the rotating magnetic dipole 28 in the BHA 18 and the magnetometer 30. Particularly, FIGS. 2 and 3 illustrate the disposition of the magnetic dipole 28 in the (x,y,z) coordinate system and the resultant magnetic moments; FIGS. 4 and 5 illustrate geometrical relationships between vectors to an observation point, from which the magnetic field $\vec{B}$ caused by the magnetic dipole 28 may be measured; and FIGS. 6A-C and 7A-C respectively illustrate the components of the magnetic field $\vec{B}$ due to the x and y components of the magnetic dipole as the magnetic dipole rotates.

Turning to FIG. 2, the magnetic dipole 28 can be modeled as a magnetic dipole M located in the BHA 18. A coordinate system (x,y,z) may be understood to attach to the BHA 18, such that the z-direction is along the axis of the BHA 18 which is generally horizontal, the x direction is generally up, and the y-direction is generally horizontal. Accordingly, in FIG. 2, the magnetic dipole 28 (illustrated as a magnetic dipole $\vec{M}$) is located at the origin of this coordinate system (x,y,z)=(0,0,0). The magnetic dipole $\vec{M}$ is transverse to the z-axis and makes an angle φ with respect to the x-axis. Note that φ is a function of time, which will be included later in the analysis. The BHA 18 may typically rotate at approximately 60 to 180 RPM, while the rate of penetration through the formation 16 may be significantly slower, at approximately 50 to 200 feet per hour. As such, the position of the BHA 18 may be assumed to be constant during the time of the measurement, such that time dependence is only in φ. As shown in FIG. 3, the magnetic dipole $\vec{M}$ can be written as the sum of two components, $$\vec{M} = M_x x + M_y y \qquad (1),$$

where $M_x = M \cos\phi$ and $M_y = M \sin\phi$.

FIGS. 4 and 5 describe relationships between vectors to an observation point 52, from which the magnetometer 30 may take readings of the magnetic field $\vec{B}$ arising from the magnetic dipole 28 (illustrated in FIGS. 2 and 3 as magnetic dipole $\vec{M}$). Particularly, FIG. 4 illustrates a vector $\vec{r}$, located at an observation point (x,y,z) relative to the magnetic dipole $\vec{M}$ at the origin, and a corresponding transverse vector $\vec{\rho}$. Notably, FIG. 4 provides the relationship between $\vec{r}$ and $\vec{\rho}$ in three-dimensional space. Similarly, FIG. 5 illustrates the geometry of transverse vector $\vec{\rho}$ in the x-y plane; the transverse vector $\vec{\rho}$ may be understood to rotate an angle ψ from the x-axis toward the y-axis. The geometry illustrated by FIGS. 4 and 5 may be described using the following mathematical relationships. As noted above, the magnetic field due to the magnetic dipole $\vec{M}$ can be written as the sum of the magnetic fields due to the two components $M_x$ and $M_y$. The static magnetic field at an observation point $\vec{r}$ due to a magnetic dipole $\vec{m}$ may be given by $$\vec{B}(\vec{r}) = \frac{\mu_0}{4\pi r^3}[3\hat{r}(\hat{r}\vec{m}) - \vec{m}], \qquad (2)$$

where $\mu_0 = 4\pi \cdot 10^{-7}$ Henry/m, $\vec{r} = xx+yy+z\hat{z}$, and x, y, and $\hat{z}$ are unit vectors in the x, y, and z directions. The magnitude of $\vec{r}$ is thus $r=\sqrt{x^2+y^2+z^2}$ and the unit vector pointing in the $\vec{r}$ direction is $\hat{r}=\vec{r}/r$. In addition, the transverse vector $\vec{\rho}$ may be defined as $\vec{\rho} = xx+yy$, where $\rho=\sqrt{x^2+y^2}$ and $\hat{\rho}=\vec{\rho}/\rho$.

Figure 6A:
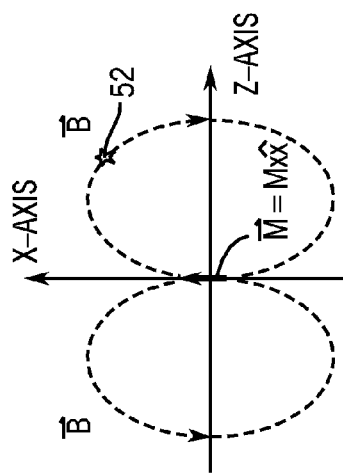
FIGS. 6A-C illustrate components of a magnetic field resulting from a magnetic dipole rotating about the z axis in the x-y plane, at the instant it is pointing in the +x direction, in accordance with an embodiment.
Figure 6B:
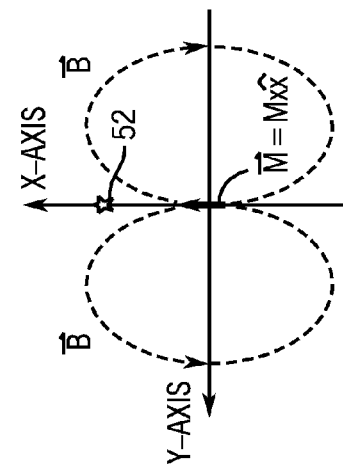
Figure 6C:
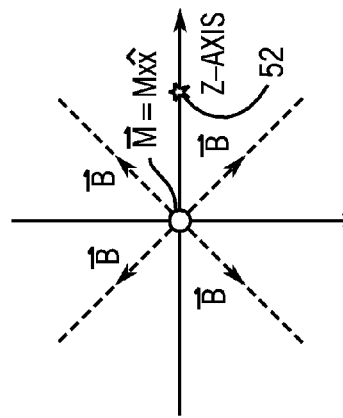
Figure 7A:
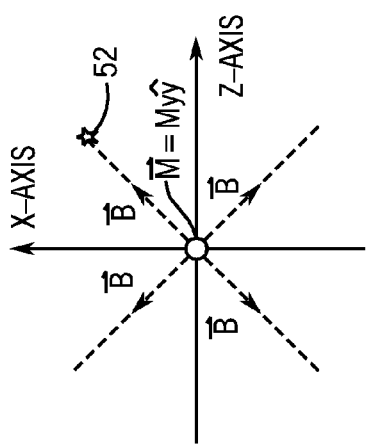
FIGS. 7A-C illustrate components of a magnetic field resulting from a magnetic dipole rotating about the z-axis in the x-y plane, at the instant it is pointing in the +y direction, in accordance with an embodiment.
Figure 7B:
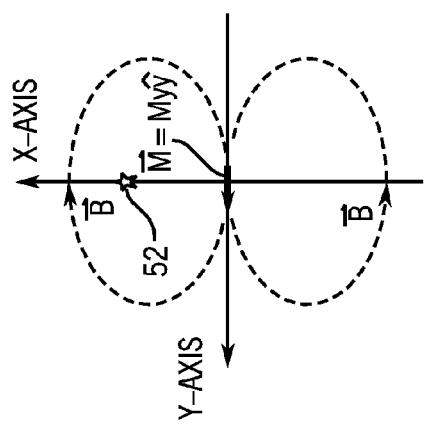
Figure 7C:
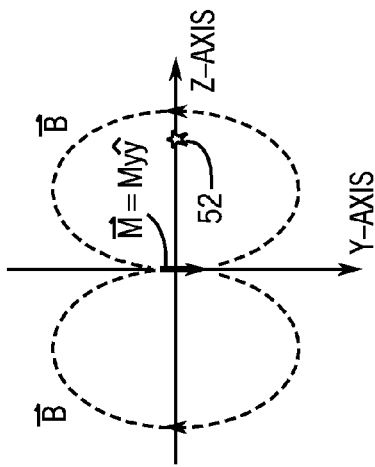

FIGS. 6A-C and 7A-C respectively illustrate the components of the magnetic field $\vec{B}$ due to the x and y components of the magnetic dipole $\vec{M}$ as the magnetic dipole $\vec{M}$ rotates. As discussed above with reference to FIG. 1, the magnetic dipole 28 or other magnetic source (the magnetic dipole $\vec{M}$) may rotate with the BHA 18, and thus may rotate around the z-axis in the x-y plane. As such, the magnetic field $\vec{B}$, as measured from the observation point 52, may vary with the rotation of the magnetic dipole $\vec{M}$ over time. Particularly, FIGS. 6A-C illustrate the magnetic field $\vec{B}$ at a point in time when the magnetic dipole $\vec{M}$ has rotated into alignment with the x-axis, and FIGS. 7A-C illustrate the magnetic field $\vec{B}$ at a point in time when the magnetic dipole $\vec{M}$ has rotated into alignment with the y-axis. In FIGS. 6A-C and 7A-C, the observation point 52, from which the magnetic field $\vec{B}$ may be measured by the magnetometer 30, is located in the upper right quadrant of the x-z plane.

Referring first to FIGS. 6A-C, because the magnetic dipole $\vec{M}$ has rotated into alignment with the x-axis, the magnetic field $\vec{B}$ due to the magnetic dipole $\vec{M}$ may be entirely due to the dipole component $M_x$. The magnetic field due to the dipole component $M_x$ may be calculated as follows. Substituting $\vec{m} = M_x x = M \cos\phi\, x$ into Equation (2) produces the results:

$$\vec{B}_x(\vec{r}) = B_{xx}(\vec{r})x + B_{xy}(\vec{r})y + B_{xz}(\vec{r})\hat{z}; \qquad (3a)$$

$$B_{xx}(\vec{r}) = \frac{3\mu_0 M \cos\phi}{4\pi r^5}(x^2 - r^2/3); \qquad (3b)$$

$$B_{xy}(\vec{r}) = \frac{3\mu_0 M \cos\phi}{4\pi r^5}(xy); \text{ and} \qquad (3c)$$

$$B_{xz}(\vec{r}) = \frac{3\mu_0 M \cos\phi}{4\pi r^5}(xz). \qquad (3d)$$

The first subscript (x) in Equations (3a) to (3d) refers to the magnetic dipole component, while the second subscript (x, y, or z) refers to the magnetic field component. From Equations (3a)-(3d), the magnetic field $\vec{B}$ due to the dipole component $M_x$ may be shown from three perspective views in FIGS. 6A-C; in all FIGS. 6A-C, the magnetic dipole $\vec{M}$ is aligned with the x-axis. FIG. 6A illustrates the magnetic field $\vec{B}$ due to the dipole component $M_x$ in the x-z plane; FIG. 6B illustrates the magnetic field $\vec{B}$ due to the dipole component $M_x$ in the x-y plane; and FIG. 6C illustrates the magnetic field $\vec{B}$ due to the dipole component $M_x$ in the y-z plane. As shown in FIG. 6A, the observation point 52 is located in the upper right quadrant of the x-z plane, and $B_{xx}$ and $B_{xz}$ are clearly nonzero as measured from the observation point 52. In fact, as described by Equations (3b) and (3d) above, the amplitudes of $B_{xx}$ and $B_{xz}$ are maxima at the observation point 52 when the magnetic dipole $\vec{M}$ has rotated into alignment with the x-axis and φ is zero. In contrast, as shown in FIG. 6B, $B_{xy}$ is zero as measured at the observation point 52. This is also apparent from Equation (3c) with y=0. These conclusions are valid for any quadrant in the x-z plane. Thus, when the observation point 52 is in the x-z plane and the magnetic dipole $\vec{M}$ has rotated into alignment with the x-axis, the amplitudes of $B_{xx}$ and $B_{xz}$ are maxima, while $B_{xy}$ is zero.

Referring next to FIGS. 7A-C, because the magnetic dipole $\vec{M}$ has rotated into alignment with the y-axis, the magnetic field $\vec{B}$ due to the magnetic dipole $\vec{M}$ may be entirely due to the dipole component $M_y$. The magnetic field due to the dipole component $M_y$ may be calculated as follows. Substituting $\vec{m} = M_y y = M \sin\phi\, y$ into Equation (2) produces the results:

$$\vec{B}_y(\vec{r}) = B_{yx}(\vec{r})x + B_{yy}(\vec{r})y + B_{yz}(\vec{r})\hat{z}; \qquad (4a)$$

$$B_{yx}(\vec{r}) = \frac{3\mu_0 M \sin\phi}{4\pi r^5}(xy); \tag{4b}$$

$$B_{yy}(\vec{r}) = \frac{3\mu_0 M \sin\phi}{4\pi r^5}(y^2 - r^2/3); \text{ and} \tag{4c}$$

$$B_{yz}(\vec{r}) = \frac{3\mu_0 M \sin\phi}{4\pi r^5}(yz). \tag{4d}$$

The first subscript (y) in Equations (4a)-(4d) refers to the magnetic dipole component, while the second subscript (x, y, or z) refers to the magnetic field component. From Equations (4a)-(4d), the magnetic field $\vec{B}$ due to the dipole component $M_y$ may be shown from three perspective views in FIGS. 7A-C; in all FIGS. 7A-C, the magnetic dipole $\vec{M}$ is aligned with the y-axis. FIG. 7A illustrates the magnetic field $\vec{B}$ due to the dipole component $M_y$ in the x-z plane; FIG. 7B illustrates the magnetic field $\vec{B}$ due to the dipole component $M_y$ in the x-y plane; and FIG. 7C illustrates the magnetic field $\vec{B}$ due to the dipole component $M_y$ in the y-z plane. As shown in FIGS. 7B and 7C, $B_{yx}$ and $B_{yz}$ are clearly zero as measured from the observation point 52. As described by Equations (4b)-(4d) above, $B_{yx}$ and $B_{yz}$ are zero when the magnetic dipole $\vec{M}$ has rotated into alignment with the y-axis and $\phi$ is $\pi/2$. This may be seen from Equations (4b) and (4d) with y=0. When the magnetic dipole $\vec{M}$ is in the same location, the amplitude of $B_{yy}$ reaches a maximum, as measured from the observation point 52. Thus, when the observation point 52 is in the x-z plane and the magnetic dipole $\vec{M}$ has rotated into alignment with the y-axis, $B_{yy}$ reaches a maximum, while $B_{yx}$ and $B_{yz}$ are zero.

The total magnetic field for any angle $\phi$ of the magnetic dipole $\vec{M}$ may be given by adding the magnetic fields from each magnetic dipole component:

$$\vec{B}(\vec{r}) = B_x(\vec{r})\hat{x} + B_y(\vec{r})\hat{y} + B_z(\vec{r})\hat{z} = \vec{B}_x(\vec{r}) + \vec{B}_y(\vec{r}); \tag{5a}$$

$$B_x(\vec{r}) = \frac{3\mu_0 M}{4\pi r^5}[(x^2 - r^2/3)\cos\phi + (xy)\sin\phi]; \tag{5b}$$

$$B_y(\vec{r}) = \frac{3\mu_0 M}{4\pi r^5}[(xy)\cos\phi + (y^2 - r^2/3)\sin\phi]; \text{ and} \tag{5c}$$

$$B_z(\vec{r}) = \frac{3\mu_0 M}{4\pi r^5}[(xz)\cos\phi + (yz)\sin\phi]. \tag{5d}$$

For the situations shown in FIGS. 6A-C and 7A-C, the position of the observation point 52 relative to the magnetometer 30 can be deduced provided one knows when the magnetic dipole $\vec{M}$ is aligned with the x-axis and when it is aligned with the y-axis. As the magnetic dipole rotates about the z-axis, the magnetic field is measured at the observation point 52. Referring to FIGS. 6A-C, the amplitudes of the magnetic field components $|B_x(\vec{r})|$ and $|B_z(\vec{r})|$ achieve their maximum amplitudes when $\phi=0$, i.e. when the magnetic dipole $\vec{M}$ is aligned with the x-axis. At the same instant $B_y(\vec{r})$ is zero. Referring to FIGS. 7A-C, both magnetic field components $B_x(\vec{r})$ and $B_z(\vec{r})$ are zero when $\phi=\pi/2$, i.e. when the magnetic dipole $\vec{M}$ is aligned with the y-axis. At the same instant, $|B_y(\vec{r})|$ achieves its maximum value. Note that $B_x(\vec{r})$ and $B_z(\vec{r})$ are in-phase since they achieve their maximum and minimum amplitudes at the same times. Note also that $B_x(\vec{r})$ and $B_y(\vec{r})$ are $\pi/2$ radians out-of-phase with each other. Hence, by measuring the magnetic field components as the magnetic dipole $\vec{M}$ rotates, and by observing when the amplitudes of field components are maxima and minima, one can determine the two instants when $\phi=0$ and $\phi=\pi/2$.

Furthermore, once these two instants when $\phi=0$ and $\phi=\pi/2$ are determined, the magnetic field components can be used to deduce the position of the observation point 52. When $\phi=0$, the nonzero magnetic field components are $$B_x(\vec{r}) = \frac{3\mu_0 M}{4\pi r^5}[x^2 - r^2/3] \text{ and } B_z(\vec{r}) = \frac{3\mu_0 M}{4\pi r^5}[xz],$$

while the nonzero magnetic field component for $\phi=\pi/2$ is $$B_y(\vec{r}) = \frac{3\mu_0 M}{4\pi r^5}[r^2/3].$$

Once these three magnetic field components are measured, these equations can be solved for x and z, given that the value for M is known. As y=0 was initially assumed, the problem is over determined, i.e. only two measurements are needed to obtain the two unknown quantities, x and z.

Figure 8:
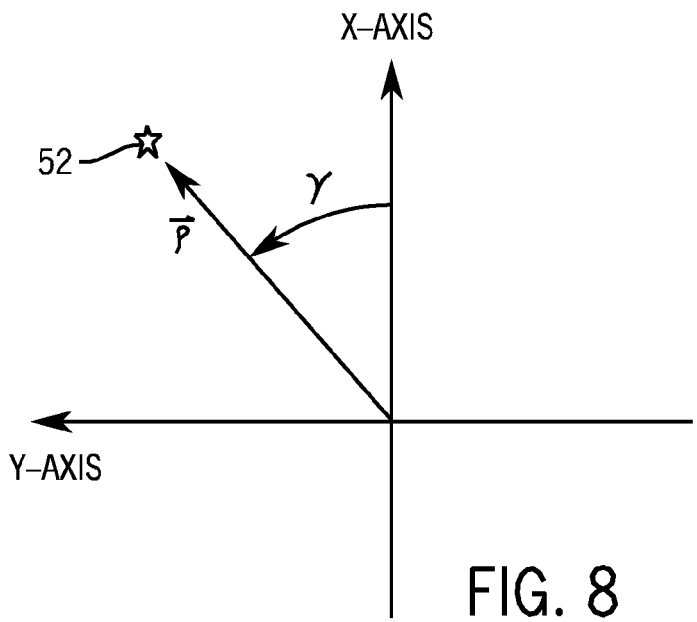
FIG. 8 is a schematic illustrating geometry associated with a transverse vector to an observation point where a magnetic field associated with a rotating magnetic dipole is measured, in accordance with an embodiment.

In the general case, the observation point may not be in the x-z plane and will have a nonzero value for y. Thus x, y and z are three unknown quantities and they must be determined from at least three measurements. From the previous paragraph, the three measured magnetic field components provide is sufficient information to determine these three unknown quantities. For any value of y, there is a plane that includes the z-axis and the observation point 52. Referring to FIGS. 8 and 9, this plane may be denoted by a primed coordinate system (x',y',z) where the x'-axis and the z-axis define the plane containing the observation point 52, and where the y'-axis is orthogonal to the plane. The x' and y' axes are obtained by rotation of the x and y axes by an angle $\theta$ about the z-axis. Since y'=0 in the rotated coordinate system, the situation in the rotated coordinate system is similar to that illustrated in FIGS. 6A-C and 7A-C, except that x is replaced by x' and y is replaced by y' in these figures.

FIG. 10 is a flowchart 54 that sets forth a general method, based on the relationships illustrated in Equations (5a) to (5d) and in FIGS. 6A-C, 7A-C, 8 and 9 above, for determining the relative location of the observation point 52 to the origin. As noted above, the observation point 52 represents the location of the magnetometer 30, while the origin represents the location of the magnetic dipole 28. Equations (5a) to (5d) may be employed to determine the location of the observation point 52 with respect to the origin. Accordingly, the present disclosure provides techniques for processing the measurements of the magnetic field $\vec{B}$ obtained by the magnetometer 30. The flowchart 54 of FIG. 10 generally describes how such techniques may be used to determine the relative location of the magnetometer 30 to the magnetic dipole 28.

In a first step 56, the magnetometer 30 may take a series of measurements of the magnetic field $\vec{B}$ over a predetermined period of time (e.g., 1-2 seconds or one or more periods of rotation of the magnetic dipole 28). If the magnetometer 30 in the producer well 14 is not completely aligned with the (x,y,z) coordinate system of the magnetic dipole 28 in the injector well 12, the raw measurements from the magnetometer 30 may be transformed into the (x,y,z) coordinate system using known survey information for the two wells and a reading from the inclinometer 36.

In step 58, the data processing circuitry 46 may receive the measurements of the magnetic field $\vec{B}$ in the (x,y,z) coordinate system over the predetermined period of time. To take advantage of Equations (5a) to (5d), the data processing circuitry 46 may rotate the magnetic field measurements by an angle θ from the (x,y,z) coordinate system into the (x',y',z) coordinate system. The angle of rotation θ is determined by requiring the magnetic component in the x' direction be ±π/2 radians out-of-phase with the magnetic field component in the y' direction. Equivalently, the angle of rotation θ is chosen such that the maxima and minima of the magnetic component in the x' direction and the y' direction occur π/2 radians apart. It should be appreciated that a variety of techniques may be employed to determine a proper angle of rotation of the reference frame, many of which are described in greater detail below.

In step 60, the relative location of the magnetometer 30 to the magnetic dipole 28 may be determined from the transformed measurements of the magnetic field $\vec{B}$ in the rotated frame of reference. Particularly, as will be described in greater detail below, the data processing circuitry 38 may determine the relative location based on the angle of rotation of the frame of reference and the amplitudes of the magnetic field $\vec{B}$ in the rotated frame of reference.

The rotation angle θ may be determined by measuring the three components of the magnetic field at the observation point 52 as a function of time. Since the magnetic dipole $\vec{M}$ is rotating, there will be instances where it is aligned with the x'-axis and times when it is aligned with the y'-axis. These instances may be determined by imposing conditions on the magnetic field components. For example, when the magnetic field component in the x' direction is ±π/2 radians out-of-phase with the magnetic field component in the y' direction, the situation is analogous to FIGS. 6A-C.

Figure 11:
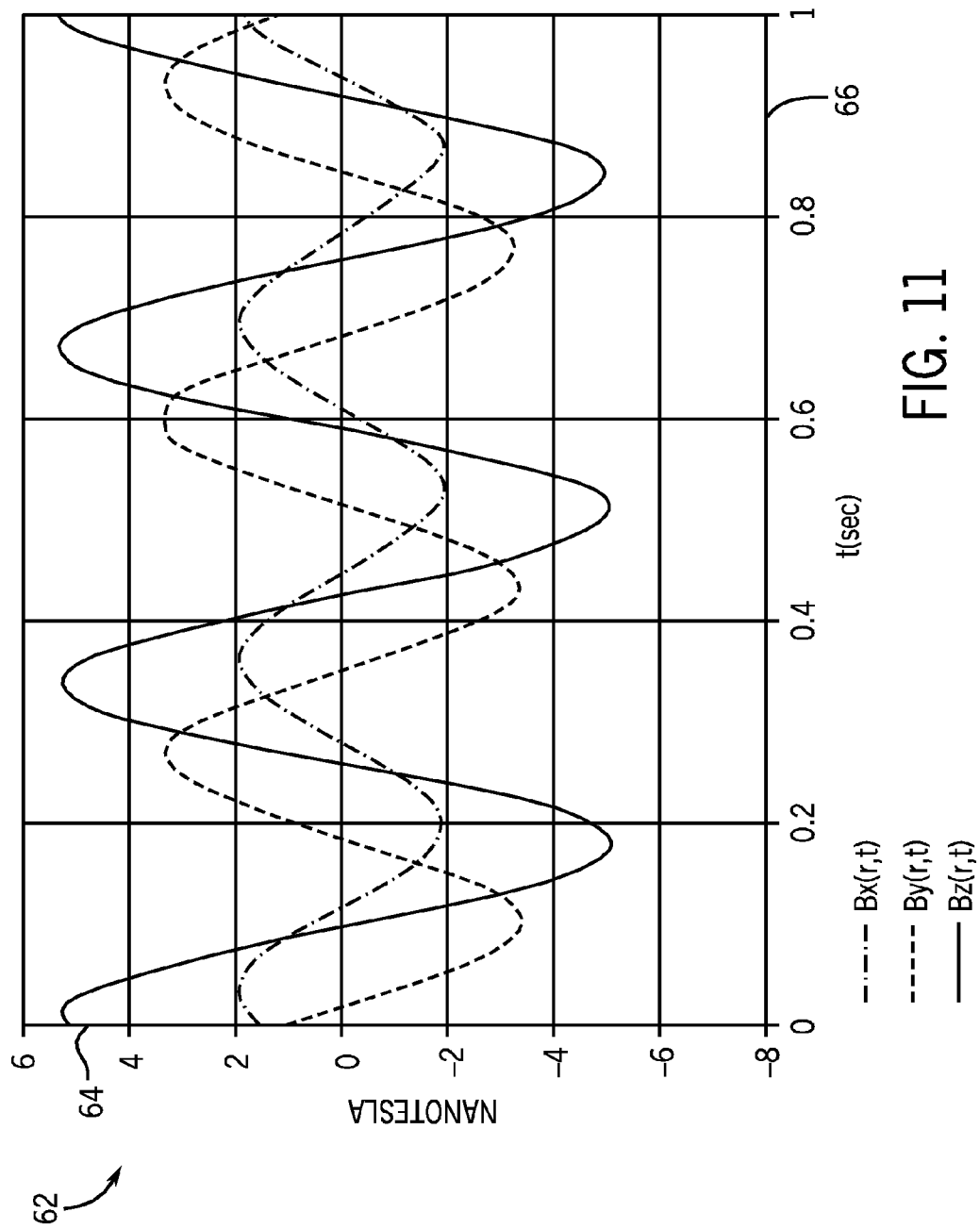
FIG. 11 is a plot simulating three-axis measurements of a magnetic dipole rotating at a constant frequency, in accordance with an embodiment.
Figure 12:
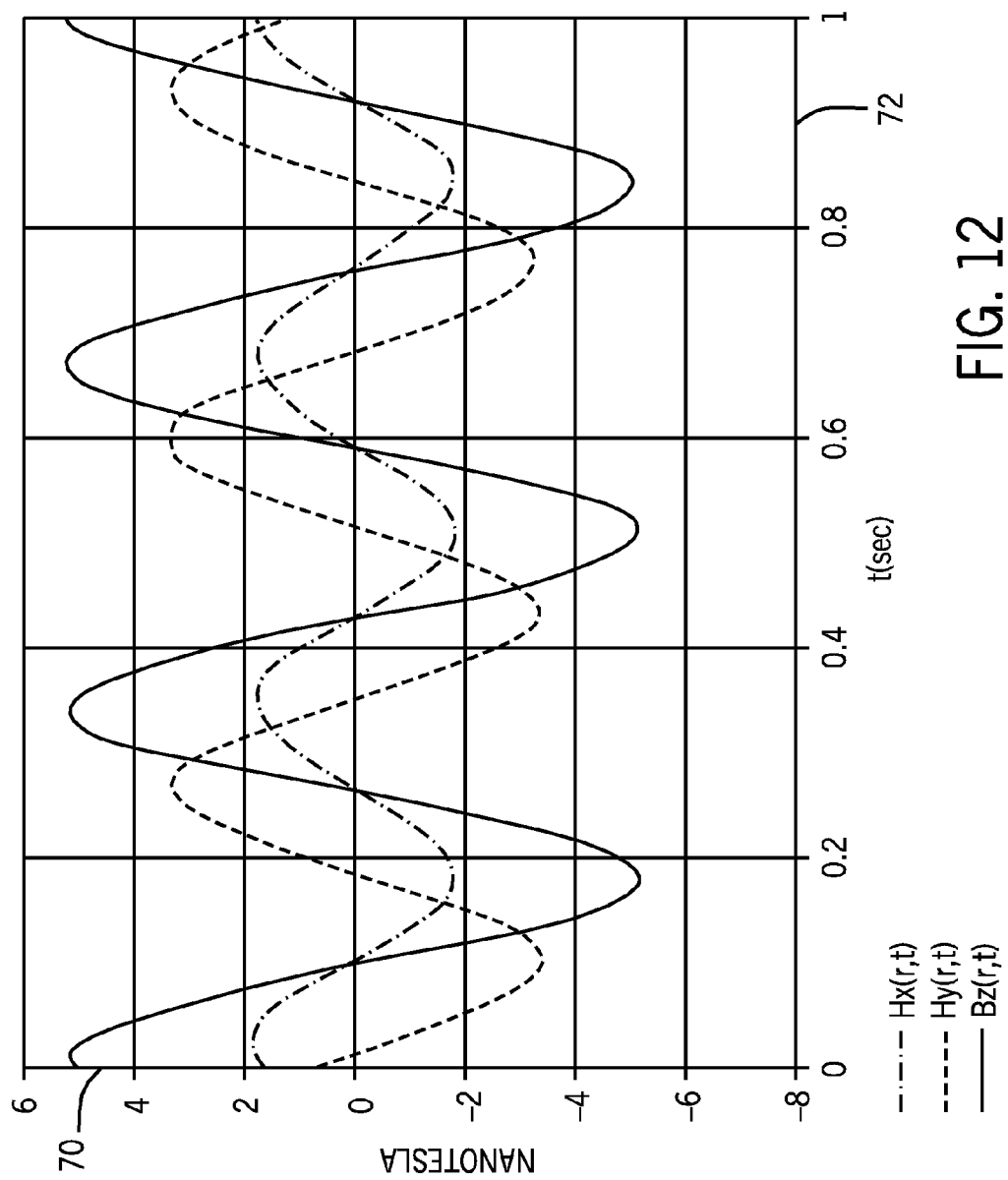
FIG. 12 is a plot in which the simulated measurements of FIG. 11 have been transformed into an a rotated frame of reference, in accordance with an embodiment.

FIGS. 11-12 illustrate an example for performing the general method of FIG. 10 in an exemplary case when the magnetic dipole 28 rotates at a constant frequency. The following analysis from Equations (5)-(13) may provide a framework for understanding FIGS. 11-12, which are discussed in greater detail below. The total magnetic field may be given by adding the magnetic fields from each magnetic dipole component:

$$\vec{B}(\vec{r}) = B_x(\vec{r})\hat{x} + B_y(\vec{r})\hat{y} + B_z(\vec{r})\hat{z}; \quad (5a)$$

$$B_x(\vec{r}) = \frac{3\mu_0 M}{4\pi r^5}[(x^2 - r^2/3)\cos\phi + (xy)\sin\phi]; \quad (5b)$$

$$B_y(\vec{r}) = \frac{3\mu_0 M}{4\pi r^5}[(xy)\cos\phi + (y^2 - r^2/3)\sin\phi]; \text{ and} \quad (5c)$$

$$B_z(\vec{r}) = \frac{3\mu_0 M}{4\pi r^5}[(xz)\cos\phi + (yz)\sin\phi]. \quad (5d)$$

The time dependence is implicit in the angle φ.

Equations (5b), (5c), and (5d) can be recast in forms that explicitly display their phases. First, an angle α may be defined such that:

$$\cos\alpha = \frac{x^2 - r^2/3}{\sqrt{x^2 y^2 + (x^2 - r^2/3)^2}}; \quad (6a)$$

$$\sin\alpha = \frac{xy}{\sqrt{x^2 y^2 + (x^2 - r^2/3)^2}}; \text{ and} \quad (6b)$$

$$\tan\alpha = \frac{xy}{x^2 - r^2/3}. \quad (6c)$$

Equation (5b) can be rewritten as:

$$B_x(\vec{r}, t) = \frac{3\mu_0 M}{4\pi r^5}\sqrt{x^2 y^2 + (x^2 - r^2/3)^2}\,[\cos\alpha\cos\phi + \sin\alpha\sin\phi], \text{ or} \quad (7a)$$

$$B_x(\vec{r}, t) = \frac{3\mu_0 M}{4\pi r^5}\sqrt{x^2 y^2 + (x^2 - r^2/3)^2}\cos(\phi - \alpha). \quad (7b)$$

An angle β may be defined such that:

$$\cos\beta = \frac{xy}{\sqrt{x^2 y^2 + (y^2 - r^2/3)^2}}; \quad (8a)$$

$$\sin\beta = \frac{y^2 - r^2/3}{\sqrt{x^2 y^2 + (y^2 - r^2/3)^2}}; \text{ and} \quad (8b)$$

$$\tan\beta = \frac{y^2 - r^2/3}{xy}. \quad (8c)$$

Equation (5c) can be rewritten as:

$$B_y(\vec{r}, t) = \frac{3\mu_0 M}{4\pi r^5}\sqrt{x^2 y^2 + (y^2 - r^2/3)^2}\cos(\phi - \beta). \quad (9)$$

An angle γ may be defined such that:

$$\cos\gamma = \frac{x}{\sqrt{x^2 + y^2}}; \quad (10a)$$

$$\sin\gamma = \frac{y}{\sqrt{x^2 + y^2}}; \text{ and} \quad (10b)$$

$$\tan\gamma = \frac{y}{x}. \quad (10c)$$

Equation (5d) can be rewritten as:

$$B_z(\vec{r}, t) = \frac{3\mu_0 M}{4\pi r^5}z\sqrt{x^2 + y^2}\cos(\phi - \gamma). \quad (11)$$

In summary, the three magnetic field components are:

$$B_x(\vec{r}, t) = B_{ox}(\vec{r})\cos(\phi - \alpha), \quad (12a)$$
$$\text{where } B_{ox}(\vec{r}) = \frac{3\mu_0 M}{4\pi r^5}\sqrt{x^2 y^2 + (x^2 - r^2/3)^2};$$

$$B_y(\vec{r}, t) = B_{oy}(\vec{r})\cos(\phi - \beta), \quad (12b)$$
$$\text{where } B_{oy}(\vec{r}) = \frac{3\mu_0 M}{4\pi r^5}\sqrt{x^2 y^2 + (y^2 - r^2/3)^2}; \text{ and}$$

-continued $$B_z(\vec{r}, t) = B_{oz}(\vec{r})\cos(\phi - \gamma), \quad (12c)$$

$$\text{where } B_{oz}(\vec{r}) = \frac{3\mu_0 M}{4\pi r^5} z\sqrt{x^2 + y^2}.$$

As discussed above, the magnetic dipole 28 may be rotating about the z-axis at the origin in the x-y plane, and the z-axis is aligned with the axis of the BHA 18. When the magnetic dipole 28 rotates at an approximately constant frequency, $\phi(t)=(2\pi f)t=\omega t$, where f is the frequency of rotation, and where $\omega=2\pi f$ is the angular frequency. However, as will be discussed further below, the techniques disclosed herein are not limited to this special case of constant frequency, but rather may be employed as long as the magnetic dipole is not stationary about the z-axis in the x-y plane.

The magnetic dipole 28 may be assumed to point in the +x direction at time t=0 since the technique disclosed herein relies not on absolute phases, but rather relative phases, among the three magnetic field components. Because the magnetic dipole 28 rotates with time, the magnetic dipole 28 makes an angle $\phi(t)=\omega t$ with respect to the x-axis at time t. The frequency and time dependence may be given by the following relationships:

$$B_x(\vec{r}, t) = B_{ox}(\vec{r})\cos(\omega t - \alpha) \quad (13a);$$

$$B_y(\vec{r}, t) = B_{oy}(\vec{r})\cos(\omega t - \beta) \quad (13b); \text{ and}$$

$$B_z(\vec{r}, t) = B_{oz}(\vec{r})\cos(\omega t - \gamma) \quad (13c).$$

As noted above, FIGS. 11-12 illustrate an example for performing the general method of FIG. 10 in an exemplary case when the magnetic dipole 28 rotates at a constant frequency. In the example of FIGS. 11-12, f=3 Hz, M=100 Amp-m$^2$, x=10 m, y=2 m, and z=10 m. Turning to FIG. 11, a plot 62 represents an idealized measurement of the magnetic field $\vec{B}$ over a period of one second based on the equations above. An ordinate 64 represents the ideal measurement of the magnetic field components of $\vec{B}$ in units of nanoTesla, and an abscissa 66 represents time in units of seconds. A dash-dotted line represents a measurement of $B_x(\vec{r}, t)$, a dashed line represents a measurement of $B_y(\vec{r}, t)$, and a solid line represents a measurement of $B_z(\vec{r}, t)$. In the graph 62, the phases of the components are $\alpha=0.559$ radians, $\beta=-1.268$ radians, and $\gamma=0.197$ radians, and the amplitudes are $B_{ox}(\vec{r})=1.91$ nanoTesla, $B_{oy}(\vec{r})=3.38$ nanoTesla, and $B_{oz}(\vec{r})=5.15$ nanoTesla.

Because the observation point 52 may be located with respect to the magnetic dipole 28 using the three magnetic field components, measured as functions of time t, the values M, $B_x(\vec{r}, t)$, $B_y(\vec{r}, t)$, and $B_z(\vec{r}, t)$ may be treated as known quantities, while the observation point $\vec{r}$ may be treated as an unknown and to be determined. Note that there are three unknown quantities, x, y, and z. The solution may be obtained by finding a transverse angle of rotation about the z-axis such that that $B_x(\vec{r}, t)$ and $B_y(\vec{r}, t)$ are transformed into magnetic field components, $H_x(\vec{r}, t)$ and $H_y(\vec{r}, t)$, that have a relative phase of $\pm\pi/2$ radians. Specifically, such a transverse angle of rotation $\theta$ may be defined according to the following equation:

$$\begin{bmatrix} H_x(\vec{r}, t) \\ H_y(\vec{r}, t) \end{bmatrix} = \begin{bmatrix} \cos\theta & \sin\theta \\ -\sin\theta & \cos\theta \end{bmatrix} \begin{bmatrix} B_x(\vec{r}, t) \\ B_y(\vec{r}, t) \end{bmatrix}, \quad (14)$$

such that the relative phase between $H_x(\vec{r}, t)$ and $H_y(\vec{r}, t)$ is $\pm\pi/2$ radians.

In Equation (14), $H_x(\vec{r}, t)$ and $H_y(\vec{r}, t)$ denote magnetic field components in the rotated frame (x',y',z), while $B_x(\vec{r}, t)$ and $B_y(\vec{r}, t)$ represent magnetic field components in the original frame (x,y,z). Since the rotation is about the z-axis, the magnetic field component in the z direction is the same in both frames. When the relative phase between $H_x(\vec{r}, t)$ and $H_y(\vec{r}, t)$ is $\pm\pi/2$ radians, the following equations are true:

$$H_x(\vec{r}, t) = H_{0x}\cos(\omega t - \delta) = H_{x0}[\cos\omega t \cos\delta + \sin\omega t \sin\delta] \quad (15a) \text{ and}$$

$$H_y(\vec{r}, t) = H_{0y}\sin(\omega t - \delta) = H_{y0}[\sin\omega t \cos\delta - \cos\omega t \sin\delta] \quad (15b),$$

where $H_{0x}$, $H_{0y}$, and $\delta$ must be determined.

Substituting Equations (5b) and (5c) into Equation (14) for $H_x(\vec{r}, t)$ produces the following:

$$H_x(\vec{r}, t) = \cos\theta\left\{\frac{3\mu_0 M}{4\pi r^5}[(x^2 - r^2/3)\cos\omega t + xy\sin\omega t]\right\} +$$

$$\sin\theta\left\{\frac{3\mu_0 M}{4\pi r^5}[xy\cos\omega t + (y^2 - r^2/3)\sin\omega t]\right\}.$$

Grouping $\cos\omega t$ and $\sin\omega t$ terms produces the following:

$$H_x(\vec{r}, t) = \cos\omega t\left\{\frac{3\mu_0 M}{4\pi r^5}[(x^2 - r^2/3)\cos\theta + xy\sin\theta]\right\} + \quad (16)$$

$$\sin\omega t\left\{\frac{3\mu_0 M}{4\pi r^5}[xy\cos\theta + (y^2 - r^2/3)\sin\theta]\right\}.$$

Equating the $\cos\omega t$ and $\sin\omega t$ terms in Equations (15a) and (16) gives the following:

$$H_{0x}\sin\delta = \frac{3\mu_0 M}{4\pi r^5}[xy\cos\theta + (y^2 - r^2/3)\sin\theta] \quad (17a)$$

and $$H_{0x}\cos\delta = \frac{3\mu_0 M}{4\pi r^5}[(x^2 - r^2/3)\cos\theta + xy\sin\theta]. \quad (17b)$$

The ratio of Equation (17a) to (17b) gives the following condition for $\delta$:

$$\tan\delta = \frac{xy + (y^2 - r^2/3)\tan\theta}{(x^2 - r^2/3) + xy\tan\theta}. \quad (18)$$

Substituting Equations (5b) and (5c) into Equation (14) for $H_y(\vec{r}, t)$ produces the following relationship:

$$H_y(\vec{r}, t) = -\sin\theta\left\{\frac{3\mu_0 M}{4\pi r^5}[(x^2 - r^2/3)\cos\omega t + xy\sin\omega t]\right\} +$$

$$\cos\theta\left\{\frac{3\mu_0 M}{4\pi r^5}[xy\cos\omega t + (y^2 - r^2/3)\sin\omega t]\right\}.$$

Grouping $\cos\omega t$ and $\sin\omega t$ terms then produces the following:

$$H_y(\vec{r}, t) = \cos\omega t\left\{\frac{3\mu_0 M}{4\pi r^5}[xy\cos\theta - (x^2 - r^2/3)\sin\theta]\right\} + \quad (19)$$

-continued
$$\sin\omega t \left\{ \frac{3\mu_0 M}{4\pi r^5} [(y^2 - r^2/3)\cos\theta - xy\sin\theta] \right\}.$$

Equating the cos ωt and sin ωt terms in Equations (15b) and (19) gives the following:

$$H_{0y}\cos\delta = \frac{3\mu_0 M}{4\pi r^5}[(y^2 - r^2/3)\cos\theta - xy\sin\theta] \tag{20a}$$

and $$-H_{0y}\sin\delta = \frac{3\mu_0 M}{4\pi r^5}[xy\cos\theta - (x^2 - r^2/3)\sin\theta]. \tag{20b}$$

The ratio of Equations (20b) to (20a) gives the following additional condition on δ:

$$\tan\delta = \frac{xy + (x^2 - r^2/3)\tan\theta}{xy\tan\theta - (y^2 - r^2/3)}. \tag{21}$$

Equating Equations (18) and (21) gives the following relationship:

$$\tan\delta = \frac{xy + (y^2 - r^2/3)\tan\theta}{(x^2 - r^2/3) + xy\tan\theta} = \frac{xy + (x^2 - r^2/3)\tan\theta}{xy\tan\theta - (y^2 - r^2/3)}. \tag{22}$$

Equation (22) has the solution $$\tan\theta = \frac{y}{x} = \tan\gamma \tag{23}$$

or, more simply:

$$\theta = \gamma + n \cdot \pi \tag{24},$$

where n is an integer, e.g. n=0,1. Note that the ambiguity in direction (n·π) is not an impediment in locating the observation point in a practical drilling situation since the general direction from the observation point to the magnetic dipole will be known. For example, it will be known from MWD direction and inclination measurements and previous magnetic ranging surveys that that the injector is being drilled above the producer, and not below it.

Substituting Equation (23) into Equation (22), one obtains the following:

$$\tan\delta = \frac{y}{x}. \tag{25}$$

Equation (16) can be factored as follows:

$$H_x(\vec{r}, t) = \frac{3\mu_0 M}{4\pi r^5}\cos$$
$$\theta[(x^2 - r^2/3) + xy\tan\theta] \cdot \left\{ \cos\omega t + \sin\omega t \left[ \frac{xy + (y^2 - r^2/3)\tan\theta}{(x^2 - r^2/3) + xy\tan\theta} \right] \right\}.$$

The term in the square brackets is recognized from Equations (21) and (25) as tan δ. Substituting tan θ=tan δ into the above equation gives the following relationship:

$$H_x(\vec{r}, t) = \frac{3\mu_0 M}{4\pi r^5}\cos\theta\left[(x^2 - r^2/3) + xy\frac{y}{x}\right]\left\{ \begin{array}{c} \cos\omega t + \\ \sin\omega t[\tan\theta] \end{array} \right\}, \tag{26}$$

$$H_x(\vec{r}, t) = \frac{3\mu_0 M}{4\pi r^5}[x^2 + y^2 - r^2/3]\left\{ \begin{array}{c} \cos\omega t\cos\theta + \\ \sin\omega t\sin\theta \end{array} \right\}, \text{ and}$$

$$H_x(\vec{r}, t) = \frac{3\mu_0 M}{4\pi r^5}\left[\frac{2}{3}r^2 - z^2\right]\cos(\omega t - \theta)$$

where $\theta = \gamma + n \cdot \pi$.

Equation (19) can be factored as follows:

$$H_y(\vec{r}, t) =$$
$$\frac{3\mu_0 M}{4\pi r^5}\cos\theta\{\cos\omega t[xy - (x^2 - r^2/3)\tan\theta] + \sin\omega t[(y^2 - r^2/3) - xy\tan\theta]\}.$$

Using Equation (23) and then completing the algebra yields the following:

$$H_y(\vec{r}, t) = \frac{3\mu_0 M}{4\pi r^5}\cos\theta \tag{27}$$
$$\left\{ \cos\omega t\left[xy - (x^2 - r^2/3)\frac{y}{x}\right] + \sin\omega t\left[(y^2 - r^2/3) - xy\frac{y}{x}\right] \right\};$$

$$H_y(\vec{r}, t) = -\frac{\mu_0 M}{4\pi r^3}\sin(\omega t - \theta).$$

Comparing Equations (26) and (27) demonstrates that $H_x(\vec{r},t)$ and $H_y(\vec{r},t)$ are out-of-phase by ±π/2 radians. In addition, $H_x(\vec{r},t)$ is in-phase with $B_z(\vec{r},t)$, in accordance with Equations (13c) and (26).

In summary, the three magnetic field components in the rotated frame may be described as follows:

$$H_x(\vec{r}, t) = H_{0x}\cos(\omega t - \gamma); \tag{28a}$$

$$H_{0x} = \frac{3\mu_0 M}{4\pi r^5}\left[\frac{2}{3}r^2 - z^2\right]; \tag{28b}$$

$$H_y(\vec{r}, t) = H_{0y}\sin(\omega t - \gamma); \tag{29a}$$

$$H_{0y} = -\frac{\mu_0 M}{4\pi r^3}; \tag{29b}$$

$$B_z(\vec{r}, t) = B_{0z}\cos(\omega t - \gamma); \tag{30a}$$

and $$B_{0z} = \frac{3\mu_0 M}{4\pi r^5}z\sqrt{x^2 + y^2}. \tag{30b}$$

The above-described situation may be understood by referring again to the magnetic field lines of FIGS. 6A-C and 7A-C. For example, consider the instant when the magnetic dipole 28 is aligned with the +x axis as illustrated by FIGS. 6A-C. Note that under the above-described conditions, the observation point 52 may be located in the upper right quadrant of the x-z plane (i.e., at a point (x,0,z)). Referring to FIG. 6A, the magnetic field components $B_z(\vec{r},t)$ and $B_x(\vec{r},t)$ will reach maximum amplitudes when the magnetic dipole 28 is aligned with the +x axis, as illustrated. However, the magnetic field component $B_y(\vec{r},t)$ will be zero at this instant, as indicated by FIG. 6B. At the instant when the magnetic dipole 28 is aligned with the +y axis, as illustrated in FIGS. 7A-C, the magnetic field component $B_y(\vec{r},t)$ will reach a maximum amplitude at the observation point 52. This circumstance is apparent in FIG. 7B. Meanwhile, magnetic field components $B_z(\vec{r},t)$ and $B_x(\vec{r},t)$ will be zero at this instant, as indicated by FIGS. 7B and 7C. Hence, Hence, $B_y(\vec{r},t)$ is $\pm\pi/2$ radians out-of-phase with $B_z(\vec{r},t)$, while $B_x(\vec{r},t)$ is in-phase with $B_z(\vec{r},t)$. However, this condition exists only for observation points in the x-z plane. For points off the x-z plane, the rotation to $B_x(\vec{r},t)$ and $B_y(\vec{r},t)$ to produce $H_x(\vec{r},t)$ and $H_y(\vec{r},t)$, described by Equation (14), should be applied.

FIG. 8 illustrates a relationship between the transverse vector $\vec{\rho}$ from the origin, which represents the location of the magnetic dipole 28, to the observation point 52, which represents the location of the magnetometer 30. According to Equation (10c), and as illustrated in FIG. 8, the angle between $\vec{\rho}$ and x is $\gamma=\tan^{-1}(y/x)$. Thus, because the condition for $H_x(\vec{r},t)$ to be $\pm\pi/2$ radians out-of-phase with $H_y(\vec{r},t)$ is given by Equation (23), $\tan\theta=\tan\gamma$, the desired phase coherence may be obtained when frame of reference is rotated by the angle $\theta$ from the x-axis. FIG. 9 illustrates the situation where a rotated (x',y',z) coordinate system is defined when the (x,y,z) coordinate system is rotated by the angle $\theta$, according to the following relationship:

$$\begin{bmatrix} x' \\ y' \end{bmatrix} = \begin{bmatrix} \cos\theta & \sin\theta \\ -\sin\theta & \cos\theta \end{bmatrix} \begin{bmatrix} x \\ y \end{bmatrix}. \quad (31)$$

Thus, when the observation point is located off of the x-z plane by an angle $\gamma$, rotating the coordinate system by an angle $\theta=\gamma+n\pi$ provides the required phase coherence. In the (x',y',z) coordinate system, $H_x(\vec{r},t)$ has a relative phase of $\pm\pi/2$ radians with respect to $H_y(\vec{r},t)$.

FIG. 12 represents a plot 68 of the measurements of FIG. 11, rotated to a frame of reference such that the relative phase between $H_x(\vec{r},t)$ and $H_y(\vec{r},t)$ is $\pm\pi/2$ radians. An ordinate 70 represents the rotated measurement of the magnetic field $\vec{B}$ in units of nanoTesla, and an abscissa 72 represents time in units of seconds. Recalling that the phases of the idealized measured magnetic field components are $\alpha=0.559$ radians, $\beta=-1.268$ radians, and $\gamma=0.197$ radians, rotating the magnetic field such that $H_x(\vec{r},t)$ is $\pm\pi/2$ radians out-of-phase with $H_y(\vec{r},t)$ may occur by applying Equation (14) with $\theta=0.197$ radians to the data illustrated in the plot 62 of FIG. 11. In the resulting plot 68, a dash-dotted line represents the x'-component of the magnetic field, $H_x(\vec{r},t)$, a dashed line represents the y'-component of the magnetic field, $H_y(\vec{r},t)$, and a solid line represents the original z-component of the magnetic field, $B_z(\vec{r},t)$. Note that $H_x(\vec{r},t)$ is $\pm\pi/2$ radians out-of-phase with respect to $H_y(\vec{r},t)$.

Figure 13:
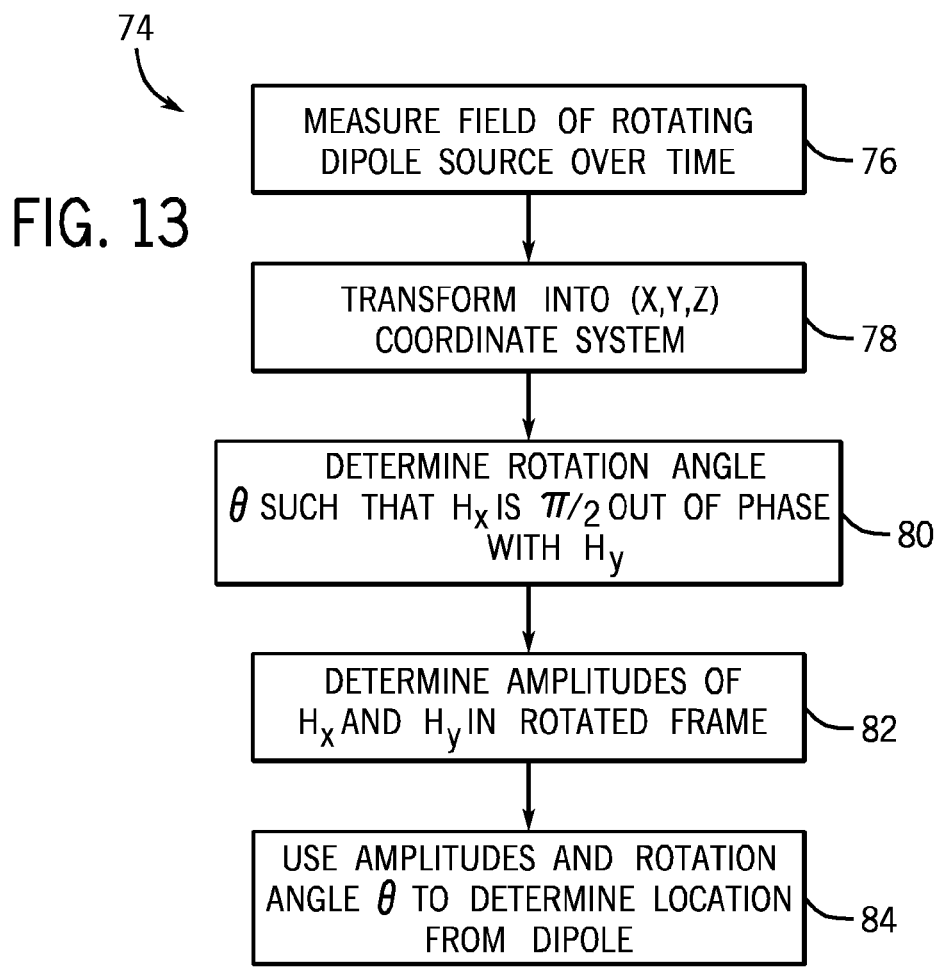
FIG. 13 is a flowchart describing a method of determining a relative location between a rotating magnetic dipole and a magnetometer by transforming magnetic field measurements into a rotated reference frame, in accordance with an embodiment.

FIG. 13 is a flowchart 74 that describes a manner of determining the relative location of the magnetometer 30 to the magnetic dipole 28 based on the equations disclosed above. It should be appreciated that further embodiments are discussed below for several, more specific, situations that may arise while drilling a new well in the proximity of an existing well. In a first step 76, the magnetometer 30 may take a series of measurements of the magnetic field $\vec{B}$ over a predetermined period of time (e.g., 1-2 seconds or one or more periods of rotation of the magnetic dipole 28). If the magnetometer 30 in the producer well 14 is not completely aligned with the (x,y,z) coordinate system of the magnetic dipole 28 in the injector well 12, in step 78, the raw measurements from the magnetometer 30 may be transformed into the (x,y,z) coordinate system using known survey information for the two wells and a reading from the inclinometer 36.

In step 80, the data processing circuitry 46 may receive the measurements of the magnetic field $\vec{B}$ taken for the predetermined period of time. The data processing circuitry 46 may rotate the frame of reference of the measurements of the magnetic field $\vec{B}$ such that the x'-component of the magnetic field, $H_x(\vec{r},t)$, is $\pm\pi/2$ radians out-of-phase with the y'-component of the magnetic field, $H_y(\vec{r},t)$. It should be noted that the x'-component of the magnetic field, $H_x(\vec{r},t)$, may simultaneously be in phase with the original z-component of the magnetic field, $B_z(\vec{r},t)$ under such an angle of rotation.

In step 82, the data processing circuitry 46 may determine the amplitudes of $H_x(\vec{r},t)$ and $H_y(\vec{r},t)$, as will be described further below. In step 84, the data processing circuitry 46 may determine the relative location of the magnetometer 30 to the magnetic dipole 28 using the amplitudes determined in step 82 and the angle of rotation of the rotated frame of reference. Particularly, the data processing circuitry 46 may employ one or more of the equations discussed below to perform steps 82 and 84.

Figure 14:
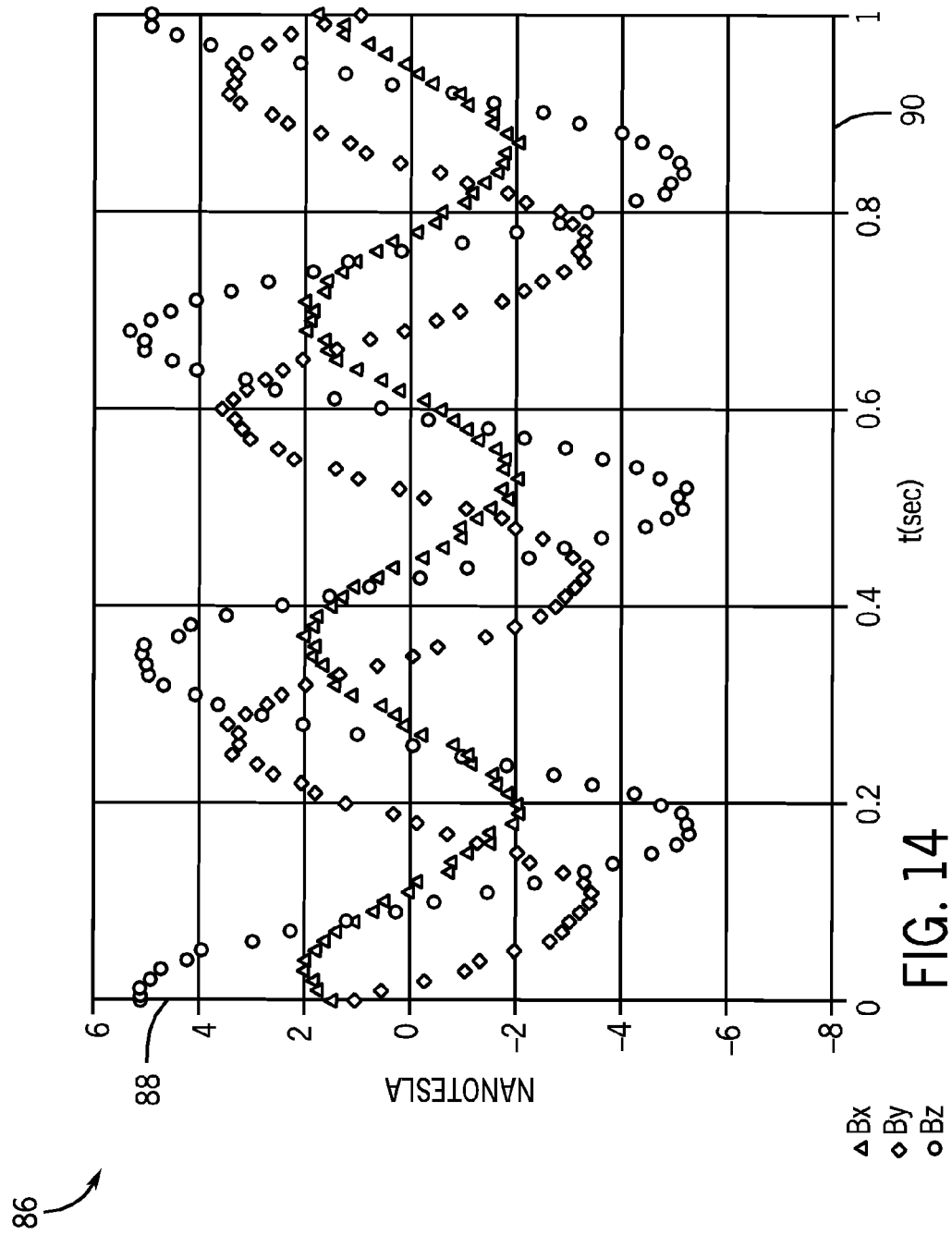
FIG. 14 is a plot simulating noisy three-axis measurements of a magnetic dipole rotating at a constant frequency, in accordance with an embodiment.
Figure 15:
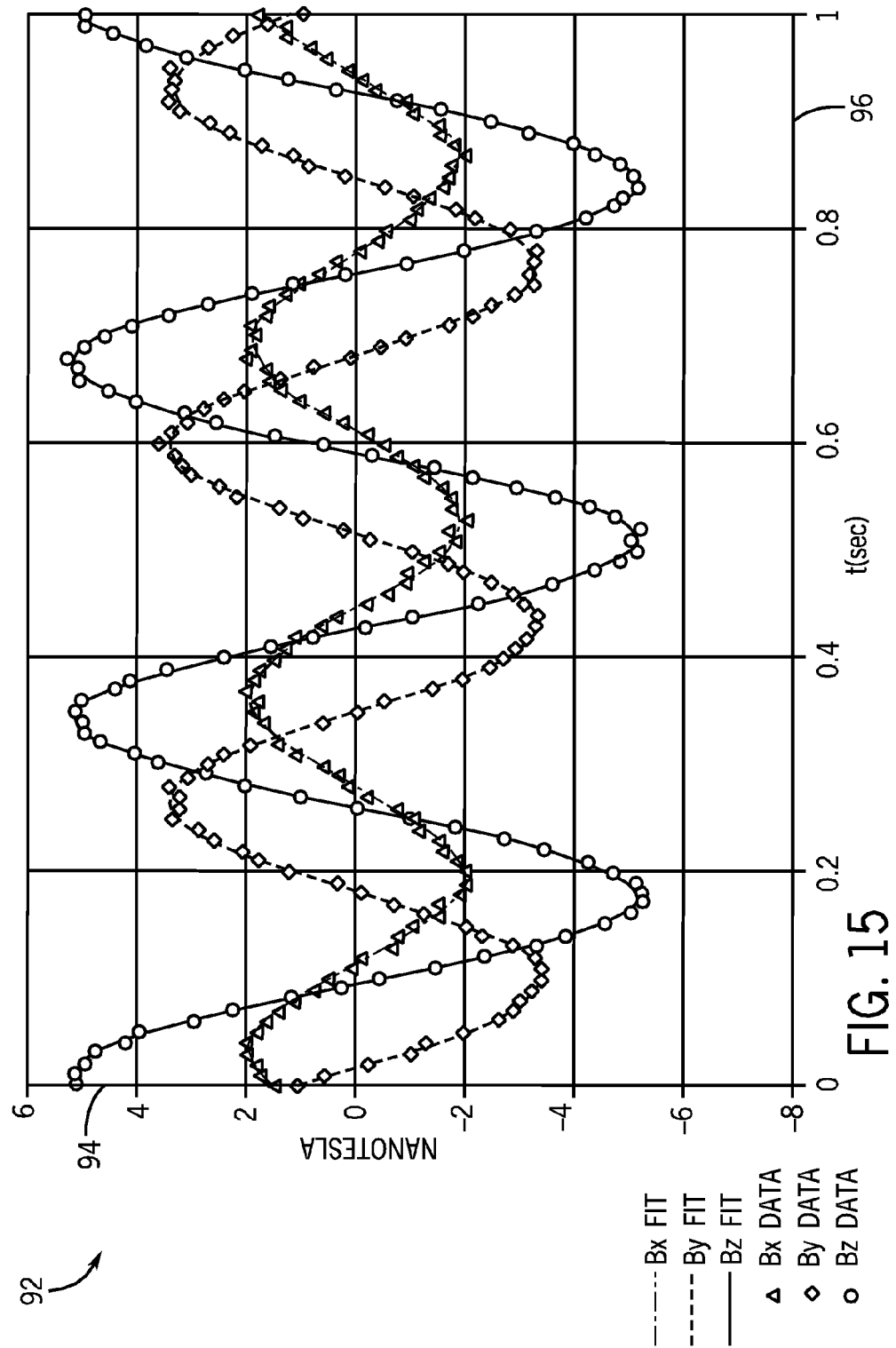
FIG. 15 is a plot sinusoids least squares fit to the noisy three-axis measurements of FIG. 14, in accordance with an embodiment.
Figure 16:
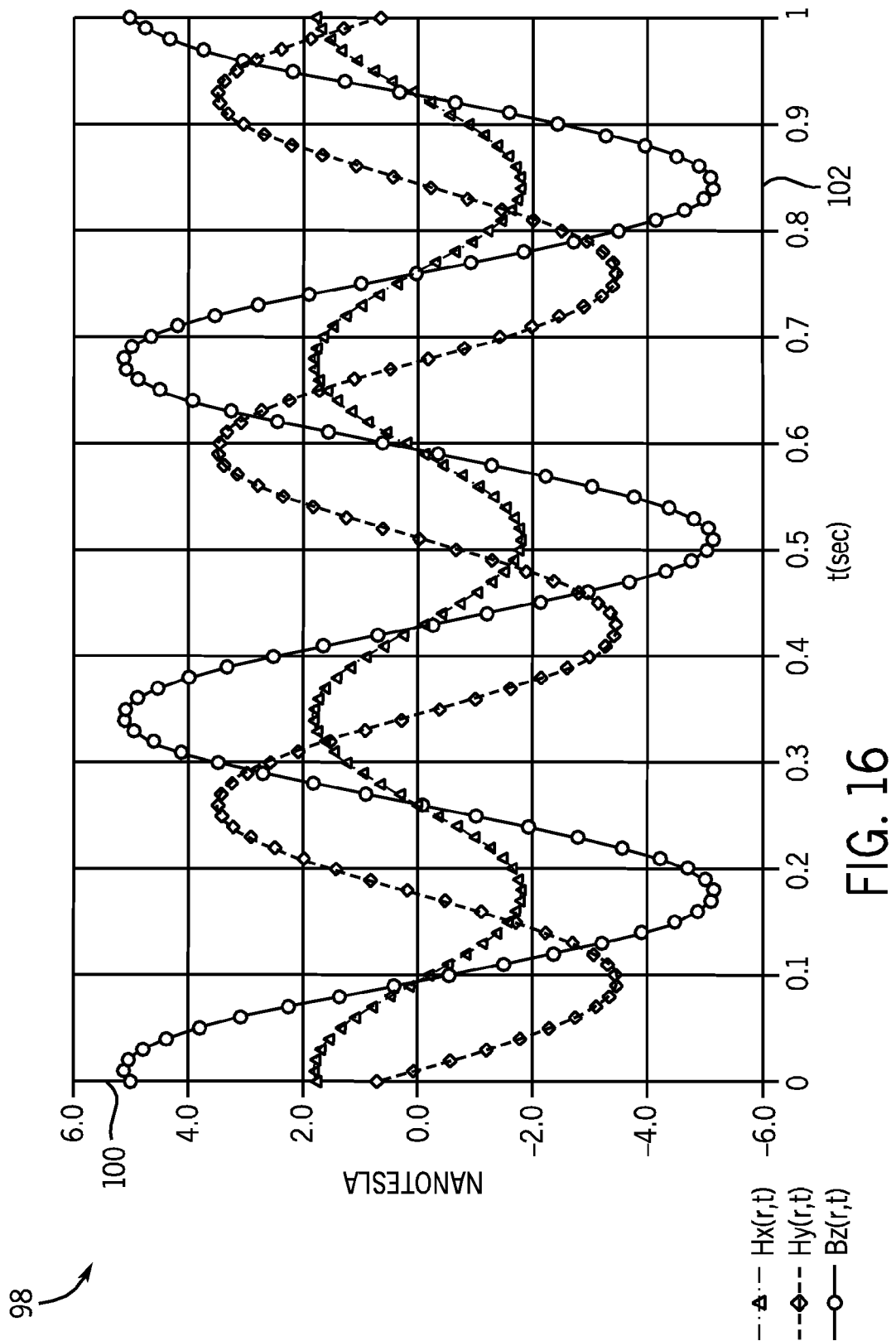
FIG. 16 is a plot in which the least squares sinusoids of FIG. 15 have been transformed into a rotated frame of reference, in accordance with an embodiment.
Figure 18:
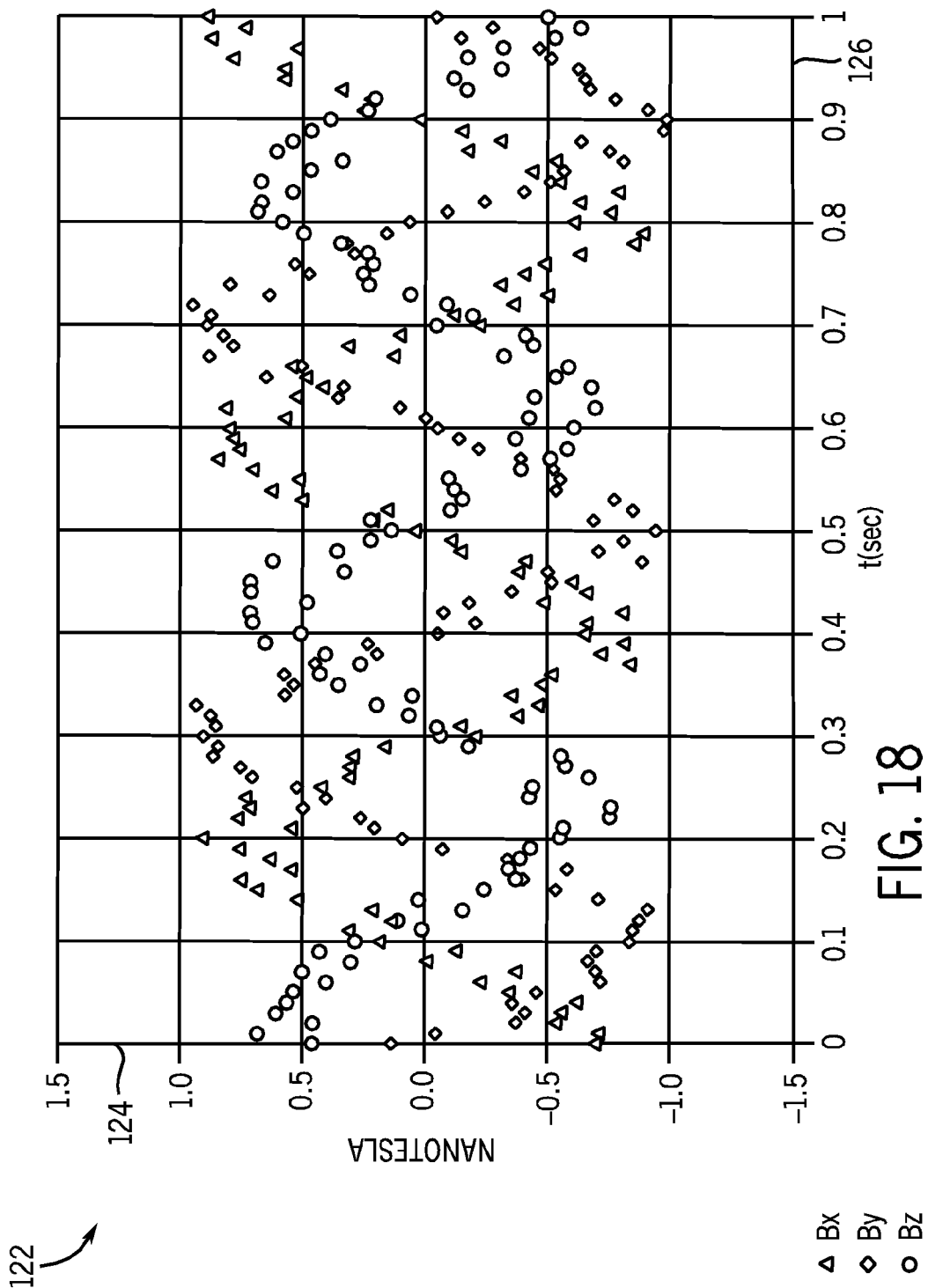
FIG. 18 is a plot simulating noisy three-axis measurements of a rotating magnetic dipole, in accordance with an embodiment.
Figure 19:
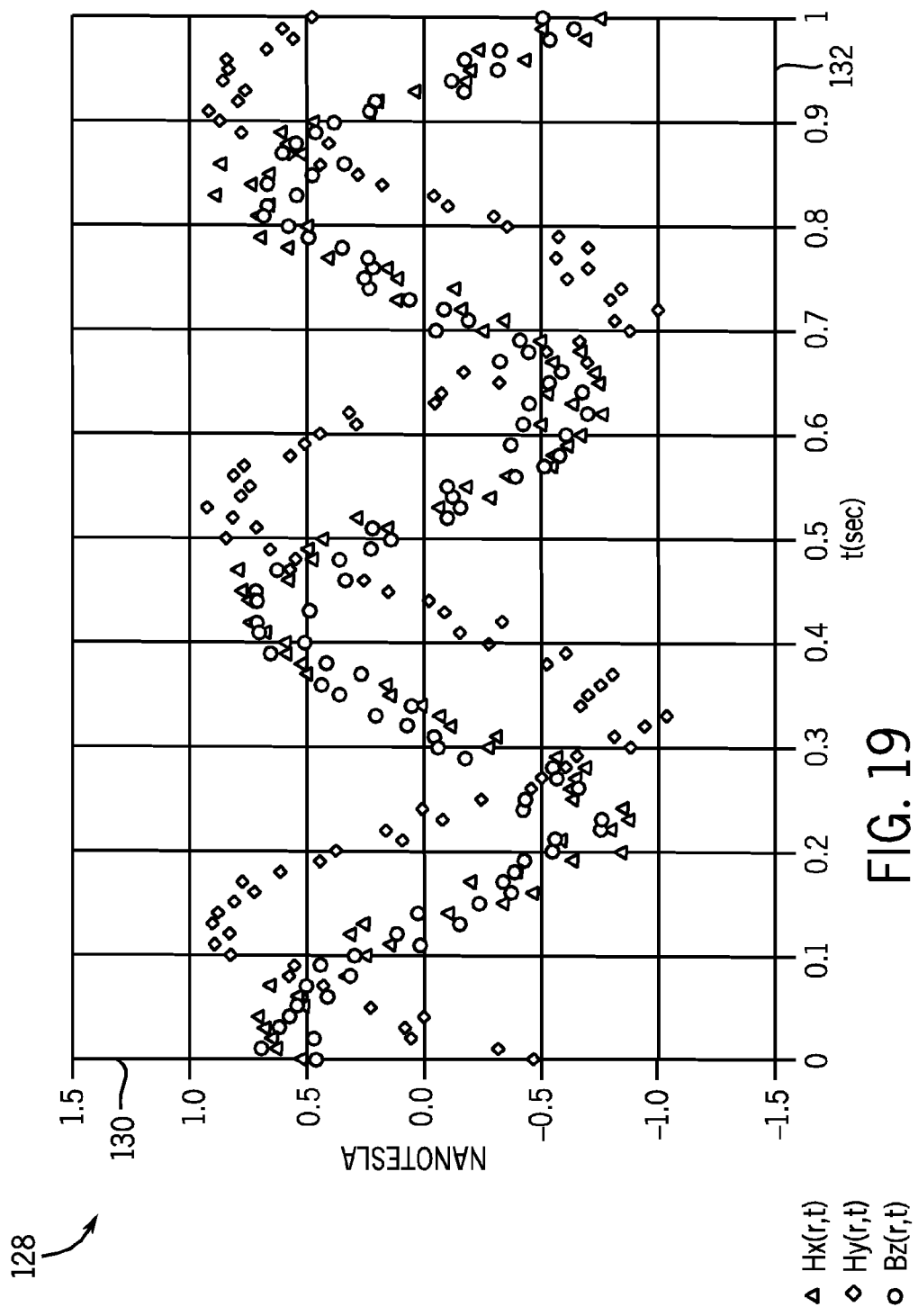
FIG. 19 is a plot in which the simulated data of FIG. 18 have been transformed into a rotated frame of reference, in accordance with an embodiment.

In the example illustrated in FIGS. 11-12, discussed above, the measurements of the magnetic field $\vec{B}$ were idealized and without error. However, measurements taken in the field may contain noise or other errors. FIGS. 14-19 represent examples of the presently disclosed technique that simulate slight errors in measurement when the magnetic dipole 28 is rotating at a constant frequency. Particularly, FIGS. 14-16 represent a first example, FIG. 17 represents a second example, and FIGS. 18 and 19 represent a third example. In the example of FIGS. 14-16, as in the example of FIGS. 11-12, f=3 Hz, M=100 Amp-m$^2$, x=10 m, y=2 m, and z=10 m. However, because real data will be noisy, random numbers will be used to simulate noise with a standard deviation of 0.1 nanoTesla. The noise is added to magnetic field components calculated using Equations (13a), (13b), and (13c). Additionally, to indicate measured quantities, a tilde will be used in the following equations. For example, $\{\tilde{B}_x(t_i)\}$, $\{\tilde{B}_y(t_i)\}$, and $\{\tilde{B}_z(t_i)\}$ refer to N measured signals obtained at times $t_i$, i=0, . . . , N–1. The vector $\vec{r}$ will be suppressed in the notation for measured quantities. It should be noted that the objective is to determine the observation point ($\vec{r}$) with respect to the rotating magnetic dipole located at (0,0,0). The three unknown quantities are x, y, and z, while the four known quantities are M and the three-axis magnetometer 30 readings. Based on the following discussion, the unknown quantities may be determined.

Turning to FIG. 14, a plot 86 represents simulated data obtained by the magnetometer 30 when f=3 Hz, M=100 Amp-m$^2$, x=10 m, y=2 m, and z=10 m. An ordinate 88 represents a measurement of the magnetic field components of $\vec{B}$ in units of nanoTesla, and an abscissa 90 represents time in units of seconds. In the plot 86, a triangle represents a data point of a measurement of the x-component of the magnetic field, $\{\tilde{B}_x(t_i)\}$, a diamond represents a data point of a measurement of the y-component of the magnetic field, $\{\tilde{B}_y(t_i)\}$, and a circle represents a data point of a measurement of the z-component of the magnetic field, $\{\tilde{B}_z(t_i)\}$. The magnetometer 30 is assumed to have taken 100 measurements of each component per second.

For constant rotation, it may be more convenient to work with functions than raw data points. As such, FIG. 15 illustrates a plot 92 the measured data of FIG. 14 that has been least squares fit to sinusoidal functions of the form: $B_j(t)=A_j \cos(\omega_j t - P_j)$, where $A_j$ is the amplitude, $P_j$ is the phase, and $\omega_j$ is the angular frequency, and j=x, y, z. An ordinate 94 represents a least squares fitting of the magnetic field $\vec{B}$ in units of nanoTesla, and an abscissa 96 represents time in units of seconds. In the plot 92, a triangle represents a data point of a measurement of the x-component of the magnetic field, $\{B_x(t_i)\}$, a diamond represents a data point of a measurement of the y-component of the magnetic field, $\{B_y(t_i)\}$, and a circle represents a data point of a measurement of the z-component of the magnetic field, $\{B_z(t_i)\}$. Additionally, a dash-dotted line represents a least squares fit sinusoid to the x-component of the magnetic field, $B_x(t)$, a dashed line represents the least squares fit of a sinusoid to the y-component of the magnetic field, $B_y(t)$, and a solid line represents the least squares fit of a sinusoid to the z-component of the magnetic field, $B_z(t)$.

To obtain the least squares fitting of the measured magnetic field $\vec{B}$ data, the frequency for each field component is allowed to float initially (since the rotation frequency may not be known at the observation point 52). There are nine parameters to be obtained by minimizing the following quantities:

$$\chi_x^2 = \sum_i \{B_x(t_i) - A_x \cos(\omega_x t_i - P_x)\}^2; \quad (32a)$$

$$\chi_y^2 = \sum_i \{B_y(t_i) - A_y \cos(\omega_y t_i - P_y)\}^2; \quad (32b)$$

and $$\chi_z^2 = \sum_i \{B_z(t_i) - A_z \cos(\omega_z t_i - P_z)\}^2. \quad (32c)$$

Once the nine parameters $A_x$, $A_y$, $A_z$, $P_x$, $P_y$, $P_z$, $\omega_x$, $\omega_y$, and $\omega_z$ are obtained from the three least squares calculations, a further condition can be imposed:

$$\bar{\omega} = (\omega_x + \omega_y + \omega_z)/3 \quad (33),$$

since the rotation rate must be the same for all magnetic field components.

Using the average value for the angular frequency obtained from Equation (33), Equations (32a), (32b), and (32c) can be minimized a second time with the constraint: $\omega_x = \omega_y = \omega_z = \bar{\omega}$. The final values for $A_x$, $A_y$, $A_z$, $P_x$, $P_y$, and $P_z$ will be then used in subsequent calculations rather than the raw measurements. For the plot 92 of FIG. 15, the fitting parameters are $\bar{\omega}=18.87$ S$^{-1}$, $A_x=1.903$ nanoTesla, $P_x=0.579$ radians, $A_y=3.414$ nanoTesla, $P_y=-1.255$ radians, $A_z=5.128$ nanoTesla, and $P_z=0.207$ radians. As illustrated in FIG. 15, the agreement between raw data and the fitting functions is very good.

Using the fitted curves of the magnetic field B measurements, an angle of rotation $\theta$ may be determined such that the x'-component of the magnetic field, $H_x(t)$, is $\pm\pi/2$ radians out-of-phase with the y'-component of the magnetic field $H_y(t)$. From Equation (14), the magnetic field components in the rotated frame can be written as follows:

$$H_x(t)=A_x \cos(\bar{\omega}t-P_x)\cos\theta + A_y \cos(\bar{\omega}t-P_y)\sin\theta \quad (34a);$$

$$H_y(t)=-A_x \cos(\bar{\omega}t-P_x)\sin\theta + A_y \cos(\bar{\omega}t-P_y)\cos\theta \quad (34b); \text{ and}$$

$$B_z(t)=A_z \cos(\bar{\omega}t-P_z) \quad (34c).$$

Since $H_x(\vec{r},t)$ and $H_y(\vec{r},t)$ are pure sinusoidal functions, it is not necessary to perform another least squares minimization to determine the proper transverse rotation angle $\theta$. Rather, the following equality may be applied:

$$H_x(\vec{r},t)=CH_y(\vec{r},t+\Delta t) \quad (35),$$

where C is a normalization constant and where $\Delta t=\pm\pi/(2\bar{\omega})$ provides the phase delay that causes $H_x(\vec{r},t)$ and $H_y(\vec{r},t)$ to be $\pm\pi/2$ radians out-of-phase.

Equation (34a) can be re-arranged as follows:

$$H_x(\vec{r},t)=\cos\bar{\omega}t[A_x \cos P_x \cos\theta + A_y \cos P_y \sin\theta] + \sin\bar{\omega}t[A_x \sin P_x \cos\theta + A_y \sin P_y \sin\theta] \quad (36).$$

Equation (34b) can be re-arranged as follows to match the right hand side of Equation (35):

$$CH_x(\vec{r},t+\Delta t)=C[-A_y \cos(\bar{\omega}t-P_x+\pi/2)\sin\theta + A_y \cos(\bar{\omega}t-P_y+\pi/2)\cos\theta]$$

Note that in the equation above, the positive sign for $\pi/2$ was chosen. The possibility of a negative sign for $\pi/2$ will be discussed below. Expanding the cosine functions and re-arranging terms may produce the following equation:

$$CH_y(\vec{r},t+\Delta t)=C\cos\bar{\omega}t[-A_x \sin P_x \sin\theta + A_y \sin P_y \cos\theta] + C\sin\bar{\omega}t[A_x \cos P_x \sin\theta - A_y \cos P_y \cos\theta] \quad (37).$$

Equation (36) can be inserted into the left hand side of Equation (35), and Equation (37) can be inserted into the right hand side of Equation (35). Since Equation (35) must be true for all time t, the $\cos\bar{\omega}t$ terms in Equations (36) and (37) (37) must be equal, and the $\sin\bar{\omega}t$ terms in both equations must be also equal. Hence, the following relationship may be determined:

$$[A_x \cos P_x \cos\theta + A_y \cos P_y \sin\theta]=C[-A_x \sin P_x \sin\theta + A_y \sin P_y \cos\theta] \quad (38a);$$

$$[A_x \sin P_x \cos\theta + A_y \sin P_y \sin\theta]=C[A_x \cos P_x \sin\theta - A_y \cos P_y \cos\theta] \quad (38b).$$

Equation (38a) can be recast as follows:

$$\tan\theta = \frac{[-A_x \cos P_x + CA_y \sin P_y]}{[CA_x \sin P_x + A_y \cos P_y]}. \quad (39a)$$

Equation (36b) can be recast as follows:

$$\tan\theta = \frac{[A_x \sin P_x + CA_y \cos P_y]}{[CA_x \cos P_x - A_y \sin P_y]}. \quad (39b)$$

Setting Equation (39a) equal to Equation (39b) allows one to solve for the normalization constant C. After algebraic manipulation, the following quadratic equation may be written:

$$C^2 + C\frac{A_x^2 + A_y^2}{A_x A_y \sin(P_x - P_y)} + 1 = 0. \quad (40)$$

A variable u may be defined as follows:

$$u \equiv \frac{A_x^2 + A_y^2}{A_x A_y \sin(P_x - P_y)}. \quad (41)$$

The solution to Equation (40) may thus be as follows:

$$C = \frac{-u \pm \sqrt{u^2 - 4}}{2}. \quad (42)$$

Since there are two roots to Equation (42), the proper root must be chosen for a physically realistic result. Substituting the solution for C into either Equation (39a) or (39b) gives tan θ, and hence one obtains the required rotation angle θ. There is an uncertainty of nπ in the rotation angle. However, standard MWD direction and inclination measurements or previous magnetic ranging surveys are sufficient to know whether the angle θ points toward the magnetic source or points away from the magnetic source. The direction from the point of observation to the z-axis is derived from tan θ=tan γ=y/x. One unknown quantity (x or y) can now be eliminated.

FIG. 16 illustrates a plot 98 of the rotated magnetic field data, which may be determined when θ=0.199 radians is obtained from the Equation (39a) or (39b) and applied to Equations (34a) and (34b). An ordinate 100 represents the magnetic field components in units of nanoTesla, and an abscissa 102 represents time in units of seconds. In the plot 98, a dash-dotted line represents the rotated x'-component of the magnetic field, $H_x(t)$, a dotted line represents the rotated y'-component of the magnetic field, $H_y(t)$, and a solid line represents the z-component of the magnetic field, $B_z(t)$. In the plot 98, the rotated x'-component of the magnetic field, $H_x(t)$, is out-of-phase with $H_y(\vec{r},t)$ by 1.569 radians, extremely close to π/2 radians.

The distance between the magnetic dipole and the observation point can now be derived. Recapping the theory so far, in the rotated frame where tan θ=tan γ, the magnetic field components have the forms given by Equations (28a), (28b), (29a), (29b), (30a), and (30b), repeated below:

$$H_x(\vec{r}, t) = H_{0x}\cos(\omega t - \gamma) \text{ and } H_{0x} = \frac{3\mu_0 M}{4\pi r^5}\left[\frac{2}{3}r^2 - z^2\right]; \quad (28a, b)$$

$$H_y(\vec{r}, t) = H_{0y}\sin(\omega t - \gamma) \text{ and } H_{0y} = -\frac{\mu_0 M}{4\pi r^3}; \quad (29a, b)$$

and $$B_z(\vec{r}, t) = B_{0z}\cos(\omega t - \gamma) \text{ and } B_{0z} = \frac{3\mu_0 M}{4\pi r^5}z\sqrt{x^2 + y^2}. \quad (30a, b)$$

Comparing Equation (30a) to Equation (34c), repeated below:

$$B_z(\vec{r},t) = A_z \cos(\overline{\omega}t - P_z) \quad (34c).$$

Hence, we can assign the following equalities:

$$A_z = B_{0z} = \frac{3\mu_0 M}{4\pi r^5}z\sqrt{x^2 + y^2} \text{ and } \gamma = P_z. \quad (43)$$

Equation (28a) can be rewritten as follows:

$$H_x(\vec{r},t) = H_{x0}\cos(\omega t - P_z) = H_{x0}[\cos \omega t \cos P_z + \sin \omega t \sin P_z] \quad (44).$$

Comparing Equation (44) to Equation (36) and equating the cos ωt and cos $\overline{\omega}$t terms gives the following relationship:

$$H_{0x} = \frac{A_x \cos P_x \cos\theta + A_y \cos P_y \sin\theta}{\cos P_z}. \quad (45a)$$

Equating the sin ωt and sin $\overline{\omega}$t terms produces an equivalent result:

$$H_{0x} = \frac{A_x \sin P_x \cos\theta + A_y \sin P_y \sin\theta}{\sin P_z}. \quad (45b)$$

Equation (29a) can be rewritten as follows:

$$H_y(\vec{r},t) = H_{y0}\sin(\omega t - P_z) = H_{y0}[\sin \omega t \cos P_z - \cos \omega t \sin P_z]. \quad (46)$$

The expression for $H_y(\vec{r},t)$ in Equation (34b) can be rewritten as follows:

$$H_y(\vec{r},t) = \cos\overline{\omega}t[-A_x \sin\theta \cos P_x + A_y \cos\theta \cos P_y] + \sin\overline{\omega}t[-A_x \sin\theta \sin P_x + A_y \cos\theta \sin P_y] \quad (47).$$

Comparing Equation (46) to Equation (47) and equating the cos ωt and cos $\overline{\omega}$t terms gives the following:

$$H_{0y} = \frac{A_x \sin\theta \cos P_x - A_y \cos\theta \cos P_y}{\sin P_z}. \quad (48a)$$

Equating the sin ωt and sin $\overline{\omega}$t terms produces an equivalent result:

$$H_{0y} = \frac{-A_x \sin\theta \sin P_x + A_y \cos\theta \sin P_y}{\cos P_z}. \quad (48b)$$

The amplitudes $B_{0z}$, $H_{0x}$, and $H_{0y}$ have now been determined from the quantities $A_x$, $A_y$, $A_z$, $P_x$, $P_y$, $P_z$ and θ. Since the magnetic dipole moment, M, is known, Equation (29b) can be inverted for r. The distance between the magnetic dipole and the observation point has now been determined using the following relationship:

$$r = \sqrt[3]{\frac{\mu_0 M}{4\pi |H_{oy}|}}. \quad (49)$$

Equation (28b) can be rewritten as follows:

$$z^2 = \frac{2}{3}r^2 \pm \frac{4\pi r^5}{3\mu_0 M}|H_{0x}| = r^2\left(\frac{2}{3} \pm \frac{1}{3}\left|\frac{H_{0x}}{H_{0y}}\right|\right), \quad (50)$$

where Equation (49) is inserted for r in Equation (50). The ±signs are required when the magnitude of $H_{0x}$ is used, as would be the case with measurement data.

Taking the square root of Equation (50) gives the value for the axial distance, $$z = \pm r\sqrt{\frac{2}{3}}\sqrt{1 \pm \frac{1}{2}\left|\frac{H_{0x}}{H_{0y}}\right|}. \quad (51)$$

Note that the proper sign must be chosen inside and outside of the square root to produce a physically reasonable answer. Noting the following:

$$\sqrt{x^2 + y^2} = x\sqrt{1 + \tan^2\theta},$$

Equation (30b) can be recast in terms of known quantities as follows:

$$x = \pm \frac{r^2}{3z\sqrt{1+\tan^2\theta}} \left|\frac{B_{0z}}{H_{0y}}\right|. \quad (52)$$

Finally, the last unknown quantity is determined according to the following relationship:

$$y = x \tan\theta \quad (53)$$

When the above-described equations are applied to the example shown in FIGS. 14-16, the relative location between the magnetic dipole 28 and the magnetometer 30 may be determined. As noted above, the determined quantities are as follows: $\bar{\omega}=18.87$ S$^{-1}$, $A_x=1.903$ nanoTesla, $P_x=0.579$ radians, $A_y=3.414$ nanoTesla, $P_y=-1.255$ radians, $B_{0z}=A_z=5.128$ nanoTesla, $P_z=0.207$ radians, and $\theta=0.199$ radians. The magnetic field amplitudes are given by Equations (45a) and (48a) as $H_{0x}=1.810$ nanoTesla and $H_{0y}=3.512$ nanoTesla. Inserting these values into Equations (49), (51), (52), and (53) produces the following values: r=14.17 m, z=9.97 m, x=9.61 m, and y=1.94 m. Since the "true" location values for this example were z=10 m, x=10 m, and y=2m, the errors are small relative to the simulated noise of 0.1 nanoTesla.

Figure 17A:
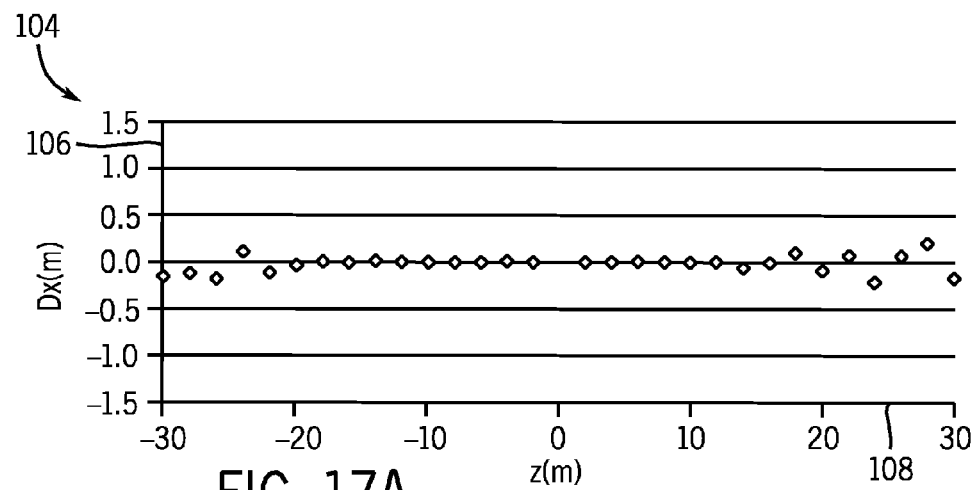
FIGS. 17A-C are plots illustrating distance errors using the disclosed technique in the x, y, and z directions, respectively.
Figure 17B:
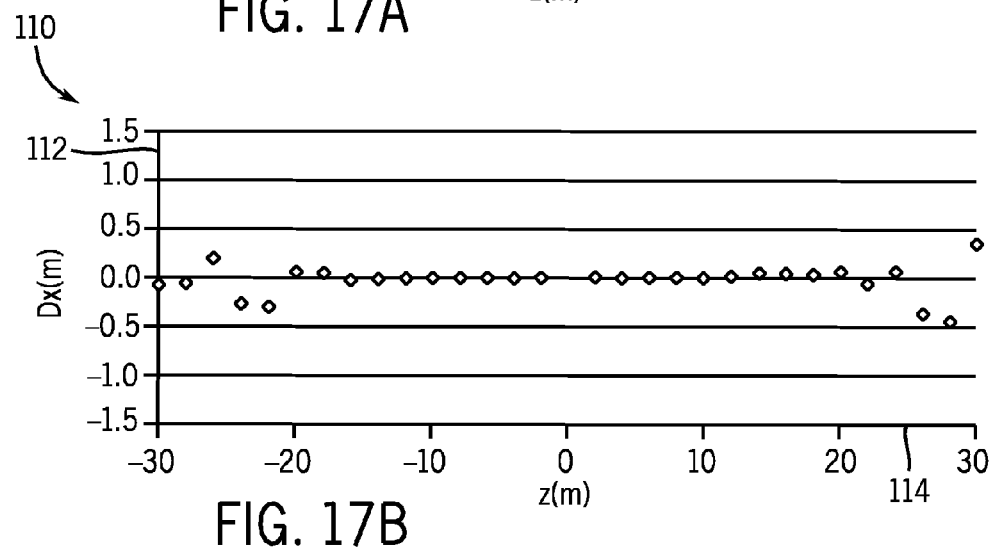
Figure 17C:
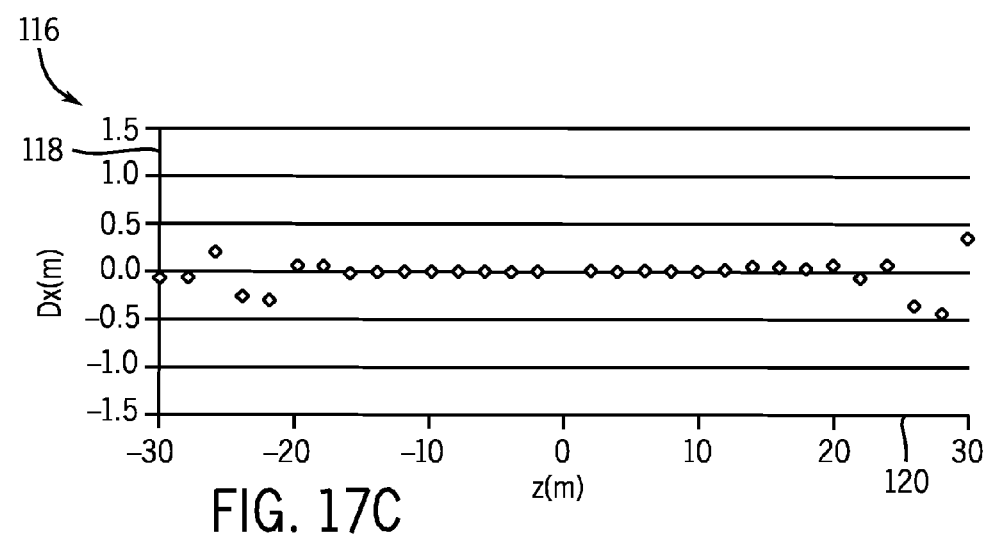

FIGS. 17A-C illustrate the amount of error associated with the above techniques when the magnetometer 30 is located at various distances from the magnetic dipole 28 along the z-axis. In FIGS. 17A-C, the magnetic dipole moment is M=100 Amp-m$^2$, and the frequency is f=2.5 Hz. Measurements are simulated as being taken along the line defined by x=5 m and y=2 m, with data points every 2 meters along the z direction at the points z=−30, −28, −26, . . . , +28, +30 m; at the point z=0 m, the magnetometer 30 is directly below the magnetic dipole 28 in the (x,y,z) coordinate system. To simulate measurements taken by the magnetometer 30 during a drilling operation, random noise of 0.1 nanoTesla is added to each sample. It should be understood that FIGS. 17A-C simulate what may occur when drilling the injector well 12, which contains the rotating magnetic dipole 28, while measuring the magnetic field $\vec{B}$ using the magnetometer 30 in the producer well 14 at a fixed location. Each data point in FIGS. 17A-C corresponds to an error associated with the solution of the position of the magnetometer 30 using data from a single relative location to the magnetic dipole 28. Particularly, the errors represent the difference between the inferred position of the magnetometer 30 relative to the magnetic dipole 28 and the "true" position (x,y,z) used to initially simulate the magnetic field $\vec{B}$. In practice, the desired quantity is the inferred position of the magnetic dipole relative to the magnetometer 30. This is given simply by (−x,−y,−z) in the coordinate system centered on the magnetometer 30. Hence, the information from the known position of the magnetometer 30 and the measured magnetic field $\vec{B}$ components can be used to steer the drill bit 20 in the injector well 12.

FIG. 17A represents a plot 104 of an error $\Delta x = \tilde{x} - x$, which indicates the difference between the value in the x-direction calculated according to the above-described techniques ($\tilde{x}$) and the actual value of the x-direction (x), at various points in the z direction. An ordinate 106 represents the error $\Delta x = \tilde{x} - x$ in units of meters, while an abscissa 108 represents points in the z-direction in units of meters at which the magnetometer 30 obtained (simulated) measurements. As illustrated in the plot 104, the errors are less than 0.5 m over the range of z=−20 m to z=+20 m, and generally less than 1 m over the range of z=−30 m to z=+30 m. Note that there is no calculation possible at z=0 m since $B_z(t)=0$ at this location.

FIG. 17B similarly represents a plot 110 of an error $\Delta y = \tilde{y} - y$, which indicates the difference between the value in the y-direction calculated according to the above-described techniques ($\tilde{y}$) and the actual value of the y-direction (y), at various points in the z-direction. An ordinate 112 represents the error $\Delta y = \tilde{y} - y$ in units of meters, while an abscissa 114 represents points in the z-direction in units of meters at which the magnetometer 30 obtained (simulated) measurements. As illustrated in the plot 110, the errors are less than 0.5 m over the range of z=−20 m to z=+20 m, and generally less than 1 m over the range of z=−30 m to z=+30 m.

FIG. 17C similarly represents a plot 116 of an error $\Delta z = \tilde{z} - z$, which indicates the difference between the value in the z-direction calculated according to the above-described techniques ($\tilde{z}$) and the actual value of the z-direction (z), at various points in the z-direction. An ordinate 118 represents the error $\Delta z = \tilde{z} - z$ in units of meters, while an abscissa 120 represents points in the z-direction in units of meters at which the magnetometer 30 obtained (simulated) measurements. As illustrated in the plot 116, the errors are less than 0.5 m over the range of z=−20 m to z=+20 m, and generally less than 1 m over the range of z=−30 m to z=+30 m.

Other methods for determining the rotation angle $\theta$ such that $H_x(\vec{r},t)$ and $H_y(\vec{r},t)$ are $\pm\pi/2$ radians out-of-phase may be applied. For example, the rotation matrix may be applied to the raw data at each time $t_i$ using the following relationship:

$$\begin{bmatrix} H_x(\vec{r},t_i) \\ H_y(\vec{r},t_i) \end{bmatrix} = \begin{bmatrix} \cos\theta & \sin\theta \\ -\sin\theta & \cos\theta \end{bmatrix} \begin{bmatrix} B_x(\vec{r},t_i) \\ B_y(\vec{r},t_i) \end{bmatrix} \quad (54)$$

to produce the data sets $\{H_x(\vec{r},t_i)\}$ and $\{H_y(\vec{r},t_i)\}$. The tilde indicates that these are data points.

The angular frequency $\omega$ may be obtained from analyzing the frequencies of the magnetic field components in the original (Earth) frame or in the rotated frame. A time delay $\Delta t = \pi/(2\omega)$ may be used to establish the phase relation between $\{H_x(\vec{r},t_i)\}$ and $\{H_y(\vec{r},t_i)\}$ by minimizing the following quantity:

$$\chi_H^2 = \sum_{i=0}^{N-1} \{H_x(\vec{r},t_i) - CH_y(\vec{r},t_i + \Delta t)\}^2, \quad (55)$$

where C is the normalization constant.

In minimizing $\chi_H^2$, both $\theta$ and C are allowed to vary. Thus, the rotation angle $\theta$ is determined modulo $n\pi$. Then either fit $\{H_x(\vec{r},t_i)\}$, $\{H_y(\vec{r},t_i)\}$, and $\{B_z(\vec{r},t_i)\}$ to sinusoidal functions to obtain the amplitudes $|H_{0x}|$, $|H_{0y}|$, and $|B_{0z}|$, or select the maximum values from the three sets of data as follows:

$$|H_{0x}| = \text{maximum}\{|H_x(\vec{r},t_i)|\} \quad (56a);$$

$$|H_{0y}| = \text{maximum}\{|H_y(\vec{r},t_i)|\} \quad (56b); \text{ and}$$

$$|B_{0z}| = \text{maximum}\{|B_z(\vec{r},t_i)|\} \quad (56c).$$

The resulting values may be used along with Equations (49) through (53) to determine the observation point relative to the magnetic dipole.

FIGS. 18 and 19 illustrate the approach described with reference to Equations (54)-(56). Turning to FIG. 18, a plot 122 represents simulated data obtained by the magnetometer 30 when f=2.5 Hz, M=100 Amp-m$^2$, x=5 m, y=2 m, and z=22 m, calculated according to Equations (5b), (5c), and (5d).

Random noise of 0.1 nanoTesla is then added to each datum to simulate measurements. An ordinate 124 represents a measurement of the magnetic field $\vec{B}$ in units of nanoTesla, and an abscissa 126 represents time in units of seconds. In the plot 122, a triangle represents a data point of a measurement of the x-component of the magnetic field, $\{B_x(\vec{r},t_i)\}$, a diamond represents a data point of a measurement of the y-component of the magnetic field, $\{B_y(\vec{r},t_i)\}$, and a circle represents a data point of a measurement of the z-component of the magnetic field, $\{B_z(\vec{r},t_i)\}$. The magnetometer 30 is assumed to have simultaneously sampled each magnetic field component every 0.01 seconds for a total measurement time of one second.

FIG. 19 illustrates a plot 128 of the measured data of FIG. 18 that has been transformed into a rotated frame of reference, such that the data of the rotated x-component of the magnetic field, $\{H_x(\vec{r},t_i)\}$, is $\pm\pi/2$ radians out-of-phase with the data of the rotated y-component of the magnetic field, $\{H_y(\vec{r},t_i)\}$. An ordinate 130 represents the transformed magnetic field $\vec{B}$ in units of nanoTesla, and an abscissa 132 represents time in units of seconds. In the plot 128, a triangle represents a data point of a measurement of the x'-component of the magnetic field, $\{H_x(\vec{r},t_i)\}$, a diamond represents a data point of a measurement of the y'-component of the magnetic field, $\{H_y(\vec{r},t_i)\}$, and a circle represents a data point of a measurement of the z-component of the magnetic field, $\{B_z(\vec{r},t_i)\}$.

The plot 128 of FIG. 19 may be obtained by applying Equation (54) to obtain the rotated data sets, $\{H_x(\vec{r},t_i)\}$ and $\{H_y(\vec{r},t_i)\}$, and minimizing $\chi_H^2$, results in C=0.838 and θ=0.519 radians. As shown in the plot 128, The maximum values from Equations (56) are $|H_{Ox}|$=0.887 nanoTesla, $|H_{Oy}|$=1.036 nanoTesla, and $|B_{Oz}|$=0.757 nanoTesla. Applying Equations (49) through (53) gives the following position estimates of x=4.62 m, y=2.64 m, and z=20.78 m. Since the position has been derived from only three measurements, representing the three data points indicating maximum amplitudes, the error due to random noise may be larger than in the previous examples where sinusoidal functions were fit to all of the data points. Accuracy may be improved by fitting $\{H_x(\vec{r},t_i)\}$, $\{H_y(\vec{r},t_i)\}$, and $\{B_z(\vec{r},t_i)\}$ to sinusoids and using the fitting amplitudes for $|H_{Ox}|$, $|H_{Oy}|$, and $\{B_z(\vec{r},t_i)\}$.

Figure 20A:
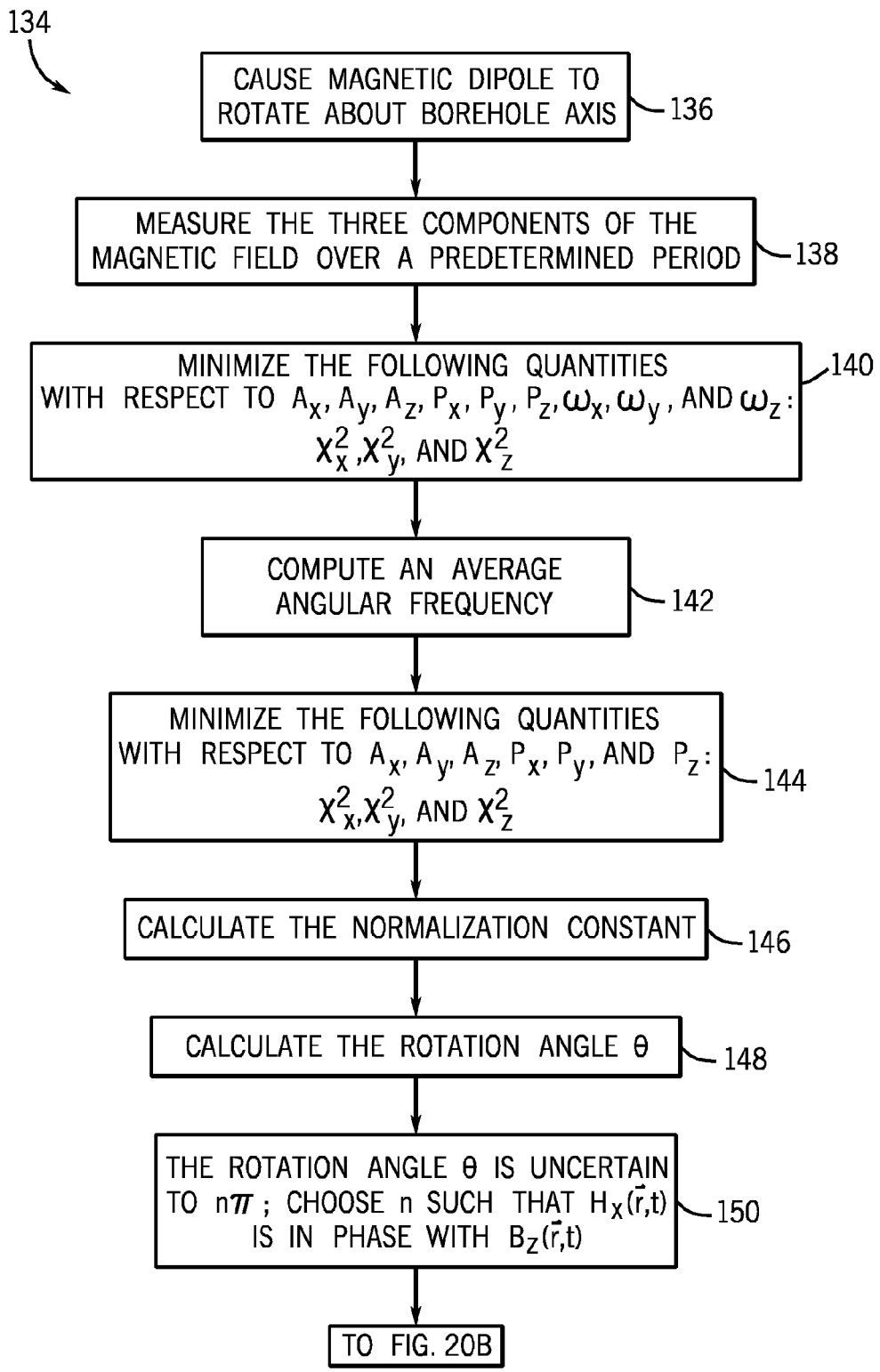
FIGS. 20A and B represent a flowchart describing a method of determining a relative location between a magnetometer and a rotating magnetic dipole by transforming magnetic field measurements into a rotated reference frame, in accordance with an embodiment.
Figure 20B:
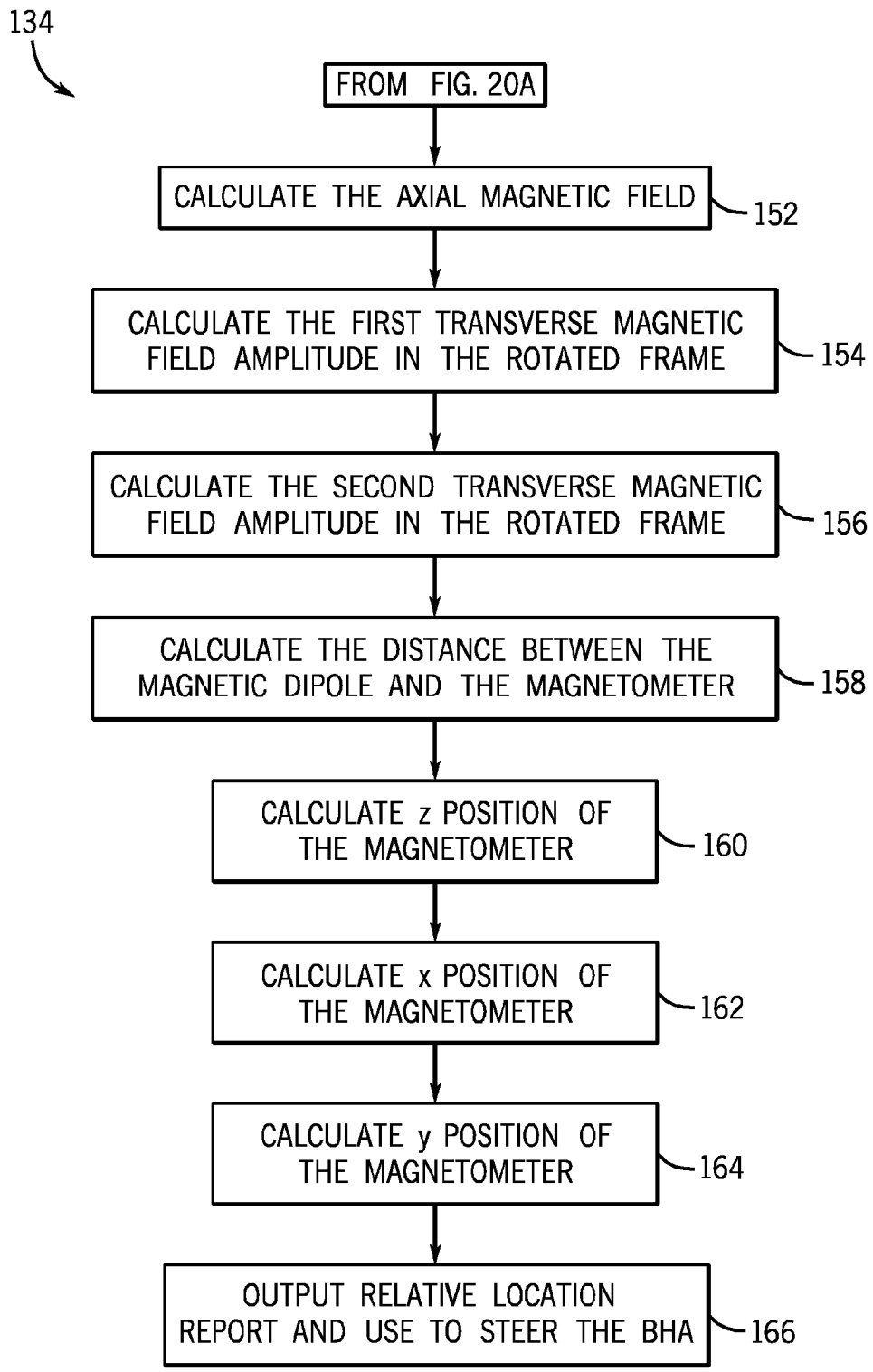

FIGS. 20A and B represent a flowchart 134 describing a general manner of drilling a new well, such as the injector well 12, proximate to an existing well, such as the producer well 14. The flowchart 134 generally recounts the techniques described above, for use when the magnetometer 30 in the producer well 14 takes measurements when the magnetic dipole 28 is rotating at a constant frequency in the injector well 12. The flowchart 134 begins with a first step 136 when the magnetic dipole 28, having a known magnetic dipole moment M, is caused to rotate about the borehole axis (e.g., the z-axis) in a first location defined as (0,0,0). As noted above, the rotating magnetic dipole 28 may be a permanent magnet rotating with the BHA 18 in the borehole, or may be a static solenoid receiving an AC current or a rotating solenoid receiving a DC current in the BHA 18. The rotation of the magnetic dipole 28 may cause a time-dependent magnetic field $\vec{B}$ to originate from the first location (0,0,0).

In a next step 138, the three magnetic field $\vec{B}$ components from the rotating magnetic dipole 28 may be measured by the magnetometer 30 for a predetermined period of time (e.g., one second or one or more periods of rotation of the magnetic dipole 28) from an observation point at $\vec{r}$ =(x,y,z). Such measurements may be denoted as $\{B_x(\vec{r},t_i)\}$, $\{B_y(\vec{r},t_i)\}$, and $\{B_z(\vec{r},t_i)\}$, which may be functions of time $t_i$, for i=0, 2, 3, ..., N−1. The magnetic field components may be represented in the (x,y,z) coordinate system defined by the magnetic dipole 28, in which the magnetic dipole 28 rotates around the z-axis in the plane of the x- and y-axes. The raw magnetometer 30 readings may be received by the data acquisition circuitry 42 before being stored in the database 44 or transmitted to the data processing circuitry 46. Particular examples of simulated magnetometer 30 readings are discussed above with reference to FIG. 14.

In steps 140-144, the raw data collected in step 138 may be least squares fitted to sinusoidal curves. As such, in step 140, the data processing circuitry may minimize the quantities $$\chi_x^2 = \sum_i \{B_x(\vec{r}, t_i) - A_x\cos(\omega_x t_i - P_x)\}^2,$$

$$\chi_y^2 = \sum_i \{B_y(\vec{r}, t_i) - A_y\cos(\omega_y t_i - P_y)\}^2, \text{ and}$$

$$\chi_x^2 = \sum_i \{B_z(\vec{r}, t_i) - A_z\cos(\omega_z t_i - P_z)\}^2,$$

where i=0, 2, 3, ..., N−1, with respect to $A_x, A_y, A_z, P_x, P_y, P_z$ $\phi_x, \omega_y$, and $\omega_z$. In step 142, the data processing circuitry 46 may compute an average angular frequency according to the equation $\overline{\omega}=(\omega_x+\omega_y+\omega_z)/3$. In step 144, the data processing circuitry may next minimize the quantities $$\chi_x^2 = \sum_i \{B_x(\vec{r}, t_i) - A_x\cos(\overline{\omega} t_i - P_x)\}^2,$$

$$\chi_y^2 = \sum_i \{B_y(\vec{r}, t_i) - A_y\cos(\overline{\omega} t_i - P_y)\}^2, \text{ and}$$

$$\chi_y^2 = \sum_i \{B_y(\vec{r}, t_i) - A_y\cos(\overline{\omega} t_i - P_y)\}^2,$$

with respect to $A_x, A_y, A_z, P_x, P_y$, and $P_z$. A particular example of the least squares fitting of step 144 is discussed above with reference to FIG. 15.

The rotated frame of reference may be determined in steps 146-150. In step 146, the data processing circuitry 46 may calculate the normalization constant $$C = \frac{-u \pm \sqrt{u^2 - 4}}{2},$$

where $$u \equiv \frac{A_x^2 + A_y^2}{A_x A_y \sin(P_x - P_y)}.$$

The proper sign for the calculation of step 146 may be chosen to ensure a physically reasonable result. In step 148, the data processing circuitry 46 may calculate the rotation angle using the relationship $$\tan\theta = \frac{[-A_x\cos P_x + CA_y\sin P_y]}{[CA_x\sin P_x + A_y\cos P_y]}$$

or

-continued $$\tan\theta = \frac{[A_x \sin P_x + CA_y \cos P_y]}{[CA_x \cos P_x - A_y \sin P_y]}.$$

In step 150, because the rotation angle θ is uncertain to nπ, the data processing circuitry 46 may use information from MWD surveys or previous magnetic ranging measurements to determine whether n=0 or n=1.

In steps 152-156, the data processing circuitry 46 may determine the amplitudes of the magnetic field components in the rotated frame of reference. In step 152, the data processing circuitry 46 may determine the axial magnetic field with $B_{0z}=A_z$. In step 154, the data processing circuitry 46 may calculate the first transverse magnetic field amplitude in the rotated frame using $$H_{0x} = \frac{A_x \cos P_x \cos\theta + A_y \cos P_y \sin\theta}{\cos P_z}$$

or with $$H_{0x} = \frac{A_x \sin P_x \cos\theta + A_y \sin P_y \sin\theta}{\sin P_z}.$$

Next, in step 156, the data processing circuitry 46 may calculate the second transverse magnetic field amplitude the rotated frame with $$H_{0y} = \frac{A_x \sin\theta \cos P_x - A_y \cos\theta \cos P_y}{\sin P_z}$$

or with $$H_{0y} = \frac{-A_x \sin\theta \sin P_x + A_y \cos\theta \sin P_y}{\cos P_z}.$$

Based at least in part on the amplitudes determined in steps 152-156, the data processing circuitry 46 may determine the relative location of the magnetometer 30 to the rotating magnetic dipole 28 in steps 158-164. In step 158, the data processing circuitry 46 may calculate the distance between the magnetic dipole and the magnetometer with $$r = \sqrt[3]{\frac{\mu_0 M}{4\pi |H_{oy}|}}.$$

In step 160, the data the data processing circuitry 46 may calculate the z position of the magnetometer 30 with $$z = \pm r \sqrt{\frac{2}{3}} \sqrt{1 \pm \frac{1}{2} \left| \frac{H_{ox}}{H_{oy}} \right|},$$

choosing signs to ensure a physically reasonable result. In step 162, the data processing circuitry 46 may calculate the x position of the magnetometer 30 with $$x = \pm \frac{r^2}{3z\sqrt{1+\tan^2\theta}} \left| \frac{B_{0z}}{H_{0y}} \right|,$$

again choosing signs to ensure a reasonable result. In step 164, the data processing circuitry 46 may calculate the y position of the magnetometer 30 with y=x tan θ.

Based on the above steps 158-164, in step 166, the data processing circuitry 46 may output a relative location report 48 indicating the relative location of the magnetometer 30 to the magnetic dipole 28. The position of the magnetic dipole 28 in a coordinate system attached to the magnetometer may be described as (-x,-y,-z). The information provided by the report 48 may be employed to steer the BHA 18 to drill a desired configuration. For example, the BHA 18 may be steered by the BHA control/MWD interface 50 such that the BHA 18 drills at an approximately constant distance (e.g., 4-6 m) above an existing well containing the magnetometer 30, which may create a SAGD well pair, as illustrated in the well-drilling operation 10 of FIG. 1.

As described, the entire process may be done without the requirement of human intervention. It can be operated as a closed loop feedback system with human oversight. Various steps in the process, such as computing the corrections and generating the steering correction can of course be done by wellsite personnel in accordance with an exemplary embodiment. However, automated computing may be more efficient. It should be noted that the automated method described above in accordance with an exemplary embodiment may be applied to any pair of wells, and is not limited to SAGD applications. The two wells may be non-parallel in general, and may even be perpendicular. Furthermore, an exemplary embodiment may be used with the magnetometer 30 deployed on a wireline or coiled tubing string, in addition to being mounted in the BHA 18.

Present embodiments may be more efficient than conventional techniques for magnetic ranging. For example, present embodiments may facilitate efficient determination of the relative location of a magnetometer to a borehole assembly (BHA). Indeed, a rotating magnetic source in a BHA may be measured over time from a single remote location. Based on the measurement data from the single remote location, data processing circuitry may determine the remote location. Thus, by refraining from multiple measurement locations, the above-disclosed techniques may conserve rig time. Present embodiments may also facilitate automation of all or a substantial portion of the entire process for determining the position of a BHA from an adjacent well and steering it based on the relative distance to the remote location.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:
1. A system comprising:
   one and only one three-axis magnetometer at a fixed location configured to determine a set of measurements taken from one observation point over a period of time of a time-dependent magnetic field caused by one and only one magnetic source rotating about an axis in a constant position during the period of time of measurement, wherein the set of measurements includes one axial component aligned with the axis and two transverse components transverse to the axis; and data processing circuitry configured to determine a transverse angle of rotation of the set of measurements, such that one of the two transverse components is $\pm\pi/2$ radians out-of-phase with the other of the two transverse components when the measurements are transformed by the transverse angle of rotation, and to determine a spatial relationship between the magnetic source and the three-axis magnetometer based at least in part on the transverse angle of rotation.

2. The system of claim 1, wherein the data processing circuitry is configured to determine the spatial relationship between the magnetic source and the three-axis magnetometer, wherein the spatial relationship describes the direction from the three-axis magnetometer and the magnetic source.

3. The system of claim 1, wherein the data processing circuitry is configured to determine the spatial relationship between the magnetic source and the three-axis magnetometer, wherein the spatial relationship describes the distance from the three-axis magnetometer to the magnetic source.

4. The system of claim 1, wherein the data processing circuitry is configured to determine sinusoidal functions that fit to the one axial component and the two transverse components.

5. The system of claim 1, wherein the data processing circuitry is configured to determine amplitudes of the one axial component and of the two transverse components in the reference frame rotated transversely by the rotation angle and wherein the data processing circuitry is configured to determine the spatial relationship based at least in part on the determined amplitudes.

6. The system of claim 1, comprising a borehole assembly having the magnetic source, wherein the axis is aligned with an axis of the borehole assembly.

7. A system comprising:
a memory device having a plurality of routines stored therein;
a processor configured to execute the plurality of routines stored in the memory device, the plurality of routines comprising:
a routine configured to effect, when executed, receiving of a three-component measurement of a time-dependent magnetic field caused by one and only one magnetic source rotating about an axis in a constant position, wherein the three-component measurement is taken from one and only one observation point and includes an axial component aligned with the axis and two transverse components transverse to the axis;
a routine configured to effect, when executed, transformation of the three-component measurement by a transverse angle of rotation such that one of the two transverse components is $\pm\pi/2$ radians out-of-phase with the other of the two transverse components;
a routine configured to effect, when executed, determination of a relative direction between the observation point and the magnetic source based at least in part on the transverse angle of rotation; and
a routine configured to effect, when executed, outputting of a report indicating the relative direction.

8. The system of claim 7, wherein the plurality of routines comprises a routine configured to effect, when executed, fitting of the three-component measurement to sinusoidal curves.

9. The system of claim 7, wherein the plurality of routines comprises a routine configured to effect, when executed, determination of a relative distance between the observation point and the magnetic source based at least in part on the axial component.

10. A method comprising:
generating a time-dependent magnetic field using one and only one magnetic source rotating about an axis, wherein the magnetic source is located in a first well;
measuring the time-dependent magnetic field from one and only one observation point in a second well, wherein the measurements include two transverse components transverse to the axis and the magnetic source is in a constant position during the measuring of the magnetic field;
determining a transverse angle of rotation that, when used in a transformation of the measurements of the time-dependent magnetic field, causes data points of one of the transverse components to be $\pm\pi/2$ radians out-of-phase with data points of the other of the transverse components; and
determining a relative direction between the magnetic source and the observation point based at least in part on the transverse angle of rotation.

11. The method of claim 7, comprising determining a relative distance between the magnetic source and the observation point based at least in part on an axial component aligned with the axis.

12. The method of claim 11, wherein the relative distance is determined based at least in part on a determination of maximum amplitudes of the axial component and the two transverse components of the transformed measurements of the time-dependent magnetic field.

13. The method of claim 11, wherein the maximum amplitudes are determined based on curves fit to maxima of the one axial component and the two transverse components of the transformed measurements of the time-dependent magnetic field.

14. The method of claim 10, wherein the magnetic source is a magnetic dipole.

15. A method comprising:
drilling a new well using a borehole assembly having one and only one magnetic source, wherein the magnetic source is configured to rotate about the axis of the borehole assembly, wherein the magnetic source is configured to generate a time-dependent magnetic field;
measuring a time-dependent magnetic field from one and only one observation point in an existing well, wherein the measurement of the time-dependent magnetic field includes an axial component aligned with the axis of the borehole assembly and two transverse components transverse to the axis of the borehole assembly and the magnetic source is in a constant position during the measuring of the field;
determining a relative direction between the observation point and the magnetic source based at least in part on a transverse angle of rotation that, when used in a transformation of the measurements of the time-dependent magnetic field, causes the two transverse components to be out-of-phase by $\pm\pi/2$ radians;
determining a relative distance between the observation point and the magnetic source based at least in part on the axial component; and
communicating a drilling trajectory to the borehole assembly based at least in part on the relative direction and the relative distance of the observation point to the magnetic source wherein the drilling trajectory is configured to cause the borehole assembly to drill the new well at an approximately constant vertical distance above or below the observation point, or to cause the borehole assembly to drill the new well approximately parallel to the existing well at an approximately constant distance from the existing well.

16. The method of claim 15, wherein the time-dependent magnetic field is measured using one wireline three-axis magnetometer placed at the observation point in the existing well.

* * * * *